United States Patent
Tang et al.

(10) Patent No.: US 11,395,263 B2
(45) Date of Patent: Jul. 19, 2022

(54) RADIO COMMUNICATION DEVICE, RADIO COMMUNICATION METHOD, AND COMPUTER PROGRAM

(71) Applicant: Sony Corporation, Tokyo (JP)

(72) Inventors: Yifu Tang, Kanagawa (JP); Hiromasa Uchiyama, Tokyo (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 47 days.

(21) Appl. No.: 16/762,510

(22) PCT Filed: Nov. 1, 2018

(86) PCT No.: PCT/JP2018/040745
§ 371 (c)(1),
(2) Date: May 8, 2020

(87) PCT Pub. No.: WO2019/098050
PCT Pub. Date: May 23, 2019

(65) Prior Publication Data
US 2021/0195558 A1    Jun. 24, 2021

(30) Foreign Application Priority Data

Nov. 16, 2017  (JP) .............................. JP2017-221009

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 28/06* (2013.01); *H04W 72/0453* (2013.01); *H04W 72/082* (2013.01)

(58) Field of Classification Search
CPC . H04W 72/02; H04W 72/04; H04W 72/0453; H04W 72/08; H04W 72/082; H04W 4/40; H04W 28/06; H04W 92/18
See application file for complete search history.

(56) References Cited

U.S. PATENT DOCUMENTS

| | | | |
|---|---|---|---|
| 2013/0034018 A1* | 2/2013 | Wei | H04W 72/0453 370/254 |
| 2015/0124737 A1* | 5/2015 | Lee | H04W 52/346 370/329 |
| 2018/0048572 A1* | 2/2018 | Gulati | H04W 52/346 |

FOREIGN PATENT DOCUMENTS

| | | |
|---|---|---|
| JP | 2012-530437 A | 11/2012 |
| JP | 2015-026990 A | 2/2015 |

(Continued)

OTHER PUBLICATIONS

Oppo, Mode 4 support in eV2X carrier aggregation, 3GPP TSG RAN WG1 Prague Cz Oct. 9-13, 2017, R1-1718036 (Year: 2017).*

(Continued)

*Primary Examiner* — Asghar H Bilgrami
(74) *Attorney, Agent, or Firm* — Xsensus LLP

(57) ABSTRACT

A radio communication device is provided that includes a communication unit which performs inter-device communication according to carrier aggregation; and a processing unit which selects the transmission resources to be used in the inter-device communication according to carrier aggregation. The processing unit selects, as the transmission resources, carriers that are less affected by the interference based on the information related to inter-carrier interference.

23 Claims, 20 Drawing Sheets

(51) Int. Cl.
*H04W 28/06* (2009.01)
*H04W 72/04* (2009.01)
*H04W 92/18* (2009.01)
*H04W 72/08* (2009.01)

(56) References Cited

FOREIGN PATENT DOCUMENTS

| | | |
|---|---|---|
| JP | 2015-508943 A | 3/2015 |
| JP | 2015-162777 A | 9/2015 |
| JP | 2016-039607 A | 3/2016 |

OTHER PUBLICATIONS

Samsung, Mode-4 support in V2X CA, 3GPP TSG RAN WG1 Prague, Czech Republic, Oct. 9-13, 2017, R1-1717553 (Year: 2017).*
Oppo, Mode 4 support in EV2X carrier aggregation, 3GPP TSG RAN WGI Prague Cz Oct. 9-13, 2017, R1-1718036 (Year: 2017).*
Huawei, HiSilicon, Discussion on sensing and resource (re) selection for carrier aggregation, 3GPP TSG RAN WG1, Prague, Czech Republic, Oct. 9-13, 2017, R1-1717002 (Year: 2017).*
Samsung, Mode-4 spport in V2X CA, 3GPP TSG RAN WG1 Prague, Czech Republic, Oct. 9-13, 2017, R1-1717553 (Year: 2017).*
Samsung: "Mode-4 support in V2X CA", 3GPP Draft; R1-1717553, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; Oct. 9, 2017-Oct. 13, 2017 Oct. 8, 2017 (Oct. 8, 2017), XP051340739, Retrieved from the Internet: URL:http://www.3gpp.org/ftp/Meetings_3GPP_SYNC/RAN1/Docs/ [retrieved on Oct. 8, 2017].
CATT: "Discussion on carrier aggregation for mode 4 in V2X Phase 2", 3GPP Draft; R1-1712339—Discussion on Carrier Aggregation for Mode 4 in V2X Phase 2, 3rd Generation Partnership Project (3GPP), Mobile Competence Centre ; 650, Route Des Lucioles ; F-06921 Sophia-Antip, vol. RAN WG1, No. Prague, Czechia; Aug. 21, 2017-Aug. 25, 2017 Aug. 20, 2017 (Aug. 20, 2017), XP051315155, Retrieved from the Internet: URL:http://www.3gpp.org/ftp/Meetings_3GPP_SYNC/RAN1/Docs/ [retrieved on Aug. 20, 2017].
International Search Report and Written Opinion dated Dec. 25, 2018 for PCT/JP2018/040745 filed on Nov. 1, 2018, 10 pages including English Translation of the International Search Report.
Guangdong Oppo Mobile Telecom, "Mode 4 support in eV2X earner aggregation," 3GPP TSG RAN WG1 Meeting #90, R1-1713251, Prague, Czech Republic, Aug. 21-25, 2017, 5 pages.
Huawei and HiSilicon, "Discussion on sensing and resource (re)selection for carrier aggregation," 3GPP TSG RAN WGI Meeting #90bis, RJ-1717002, Oct. 9-13, 2017, 4 pages.
Nokia and Nokia Shanghai Bell, "Mode 4 support for V2X carrier aggregation," 3GPP TSG RAN WG1 Meeting #90bis, R1-1717765, Prague, Czech Republic, Oct. 9-13, 2017, pp. 1-3.
Oppo, "Mode 4 support in eV2X carrier aggregation," 3GPP TSG ,RAN WG1 Meeting #90bis, R1-1718036, Prague, Czech Republic, Oct. 9-13, 2017, 4 pages.
Qualcomm Incorporated, "Carrier Aggregation for V2X Phase 2," 3GPP TSG RAN WG1 Meeting #90, R1-1713030, Prague, Czech-Republic, Aug. 21-25, 2017, 6 pages.

* cited by examiner

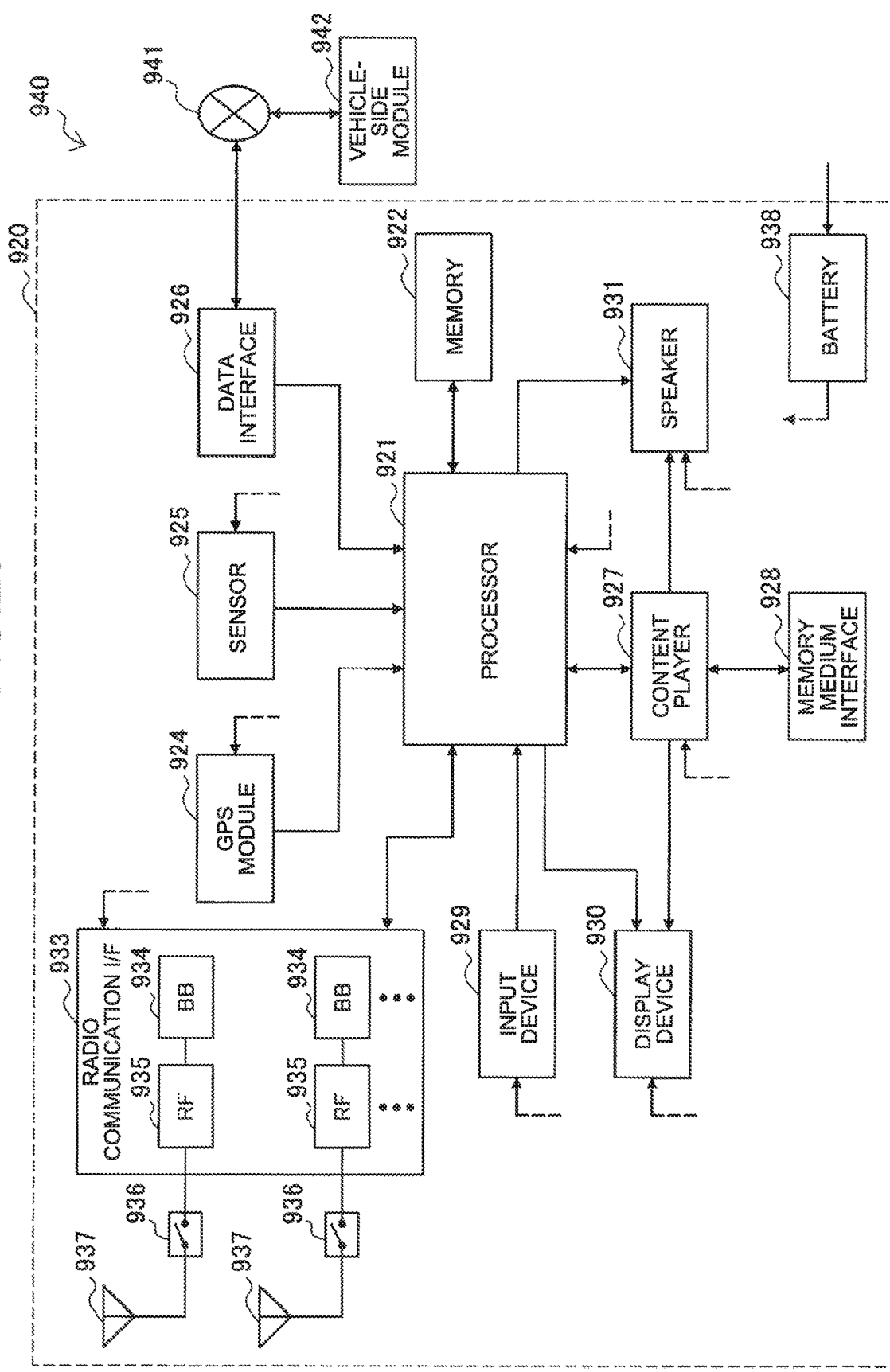

RADIO COMMUNICATION DEVICE, RADIO COMMUNICATION METHOD, AND COMPUTER PROGRAM

CROSS-REFERENCE TO RELATED APPLICATIONS

The present application is based on PCT filing PCT/JP2018/040745, filed Nov. 1, 2018, which claims priority to JP 2017-221009, filed Nov. 16, 2017, the entire contents of each are incorporated herein by reference.

FIELD

The application concerned is related to a radio communication device, a radio communication method, and a computer program.

BACKGROUND

A technology has been disclosed for allotting resources during D2D (Device to Device) communication among terminal devices (for example, Patent Literature 1).

On the other hand, in regard to implementation of the prospective automated driving, expectations toward in-vehicle communication (V2X communication) are heightened in recent years. Herein, V2X communication stands for Vehicle to X communication, and represents a system in which a vehicle and "something" communicate with each other. Examples of "something" include a vehicle, a facility (infrastructure/network), and a pedestrian (i.e., V2V, V2I/N, and V2P). As far as the radio communication for vehicles is concerned, it was the development of DSRC (Dedicated Short Range Communication) based on 802.11p that was mainly carried out till now. However, in recent years, a discussion has started regarding standardization of "LTE-based V2X" that represents in-vehicle communication based on the LTE.

CITATION LIST

Patent Literature

Patent Literature 1: Japanese Translation of PCT International Application Publication No. 2015-508943

SUMMARY

Technical Problem

In the application concerned; a radio communication device, a radio communication method, and a computer program product in a new and improved form are proposed that enable efficient selection of resources for inter-device communication including the V2X communication.

Solution to Problem

According to the present disclosure, a radio communication device is provided that includes: a communication unit that performs inter-device communication according to carrier aggregation; and a processing unit that selects transmission resource to be used in the inter-device communication according to carrier aggregation, wherein the processing unit selects, as the transmission resource, carrier that is less affected by interference based on information related to inter-carrier interference.

Moreover, according to the present disclosure, a radio communication method implemented in a processor is provided that includes: performing inter-device communication according to carrier aggregation; and selecting that, at time of selecting transmission resource to be used in the inter-device communication according to carrier aggregation, includes selecting, as the transmission resource, carrier that is less affected by interference based on information related to inter-carrier interference.

Moreover, according to the present disclosure, a computer program is provided that causes a computer to execute: performing inter-device communication according to carrier aggregation; and selecting that, at time of selecting transmission resource to be used in the inter-device communication according to carrier aggregation, includes selecting, as the transmission resource, carrier that is less affected by interference based on information related to inter-carrier interference.

Advantageous Effects of Invention

As explained above, according to the application concerned, it is possible to provide a radio communication device, a radio communication method, and a computer program product in a new and improved form for enabling efficient selection of resources for inter-device communication including the V2X communication.

Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 20 is a block diagram illustrating an example of a schematic configuration of a car navigation device 920 in which the technology disclosed in the application concerned is applicable.

DESCRIPTION OF EMBODIMENTS

Figure 1:
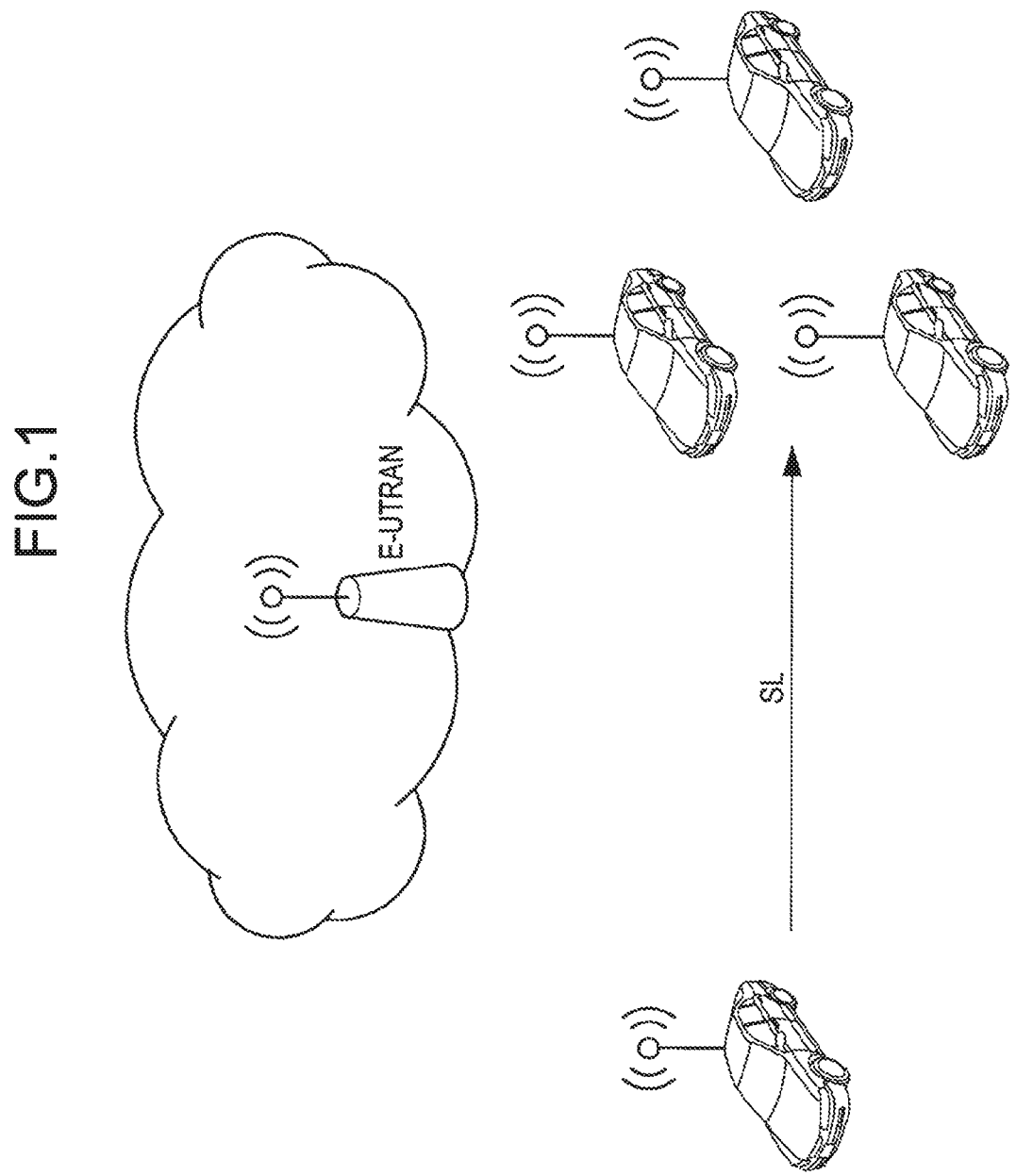
FIG. 1 is an explanatory diagram for explaining a V2X operation scenario.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. Embodiment of application concerned
1.1. Overview
1.2. Configuration example
1.3. Operation examples
2. Application examples
3. Summary

1. EMBODIMENT OF APPLICATION CONCERNED 1.1. Overview

Firstly, the explanation is given about the overview of an embodiment of the application concerned.

As described earlier, in regard to implementation of the prospective automated driving, expectations toward in-vehicle communication (V2X communication) are heightened in recent years. Herein, V2X communication stands for Vehicle to X communication, and represents a system in which a vehicle and "something" communicate with each other. Examples of "something" include a vehicle, a facility (infrastructure/network), and a pedestrian (i.e., V2V, V2I/N, and V2P). As far as the radio communication for vehicles is concerned, it was the development of DSRC (Dedicated Short Range Communication) based on 802.11p that was mainly carried out till now. However, in recent years, a discussion has started regarding standardization of "LTE-based V2X" that represents in-vehicle communication based on the LTE.

As a use case of the V2X communication, the safety usages are the main targets; and there is a demand for periodic message transmission in which messages are regularly transmitted to the vehicle, and there is a demand for communication such as event trigger messages that provide necessary information in response to events (3GPP TR 22.885).

As the base technology for the V2X communication, the D2D (Device to device) communication that is standardized in the past in 3GPP can be cited. Since the D2D communication represents inter-terminal communication not involving a base station, it is possible to think of applying the D2D communication by enhancing it to the V2V communication or the V2P communication (also applicable to the V2I communication in some cases). Such an interface among terminal is called a PC5 interface.

Moreover, in the V2I communication or the V2N communication, it is possible to think of enhancing and applying the communication performed among existing base stations and terminals. Such an interface among base stations and terminals is called a Uu interface.

In order to achieve such V2X communication, it is necessary to enhance the PC5 interface or the Uu interface in such a way that the requirements are satisfied.

The main points of enhancement include, for example, improvement in the resource allocation, Doppler frequency measures, establishment of synchronization methods, implementation of low-power consumption communication, and implementation of low-delay communication.

(V2X Operation Scenarios)

The following explanation is given about V2X operation scenarios. The V2V communication serves as the base for the configuration. In the following explanation, when one of the involved entities changes from an automobile to a pedestrian, the communication is V2P communication; and, when the communication is terminated at a facility or a network, it is V2I/N communication.

Figure 2:
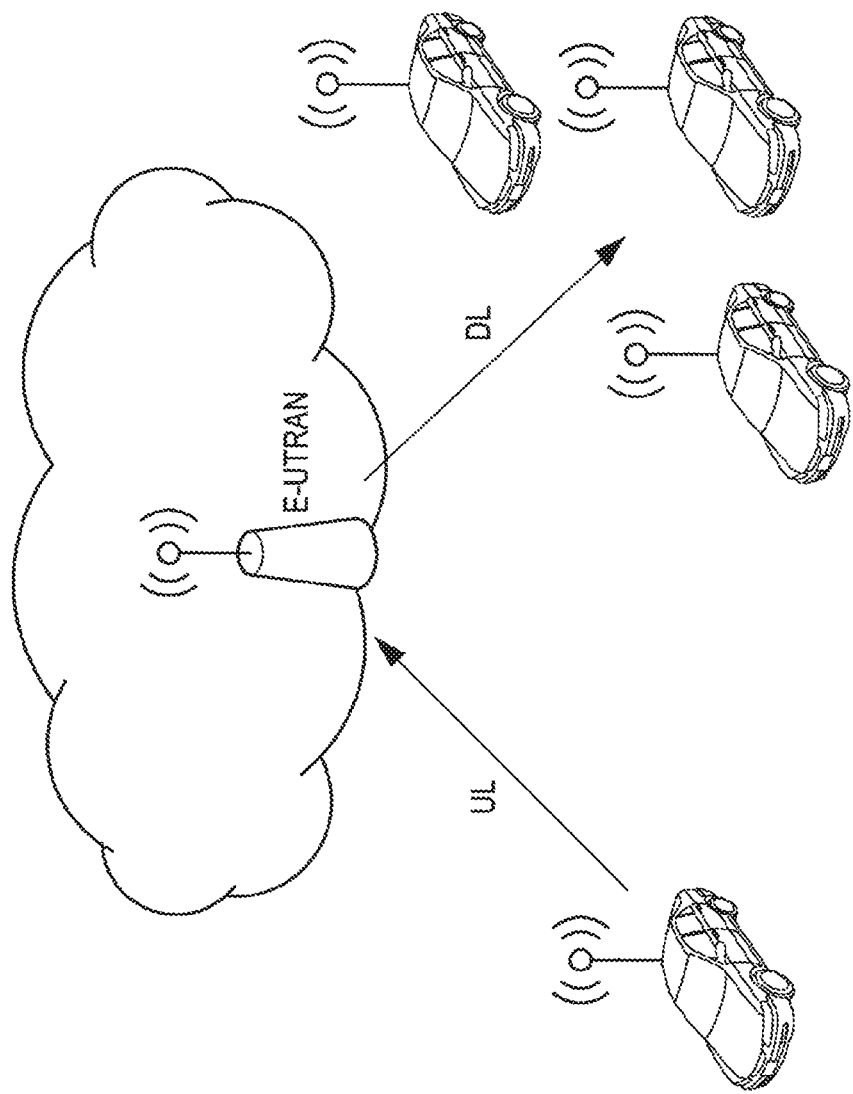
FIG. 2 is an explanatory diagram for explaining a V2X operation scenario.
Figure 3:
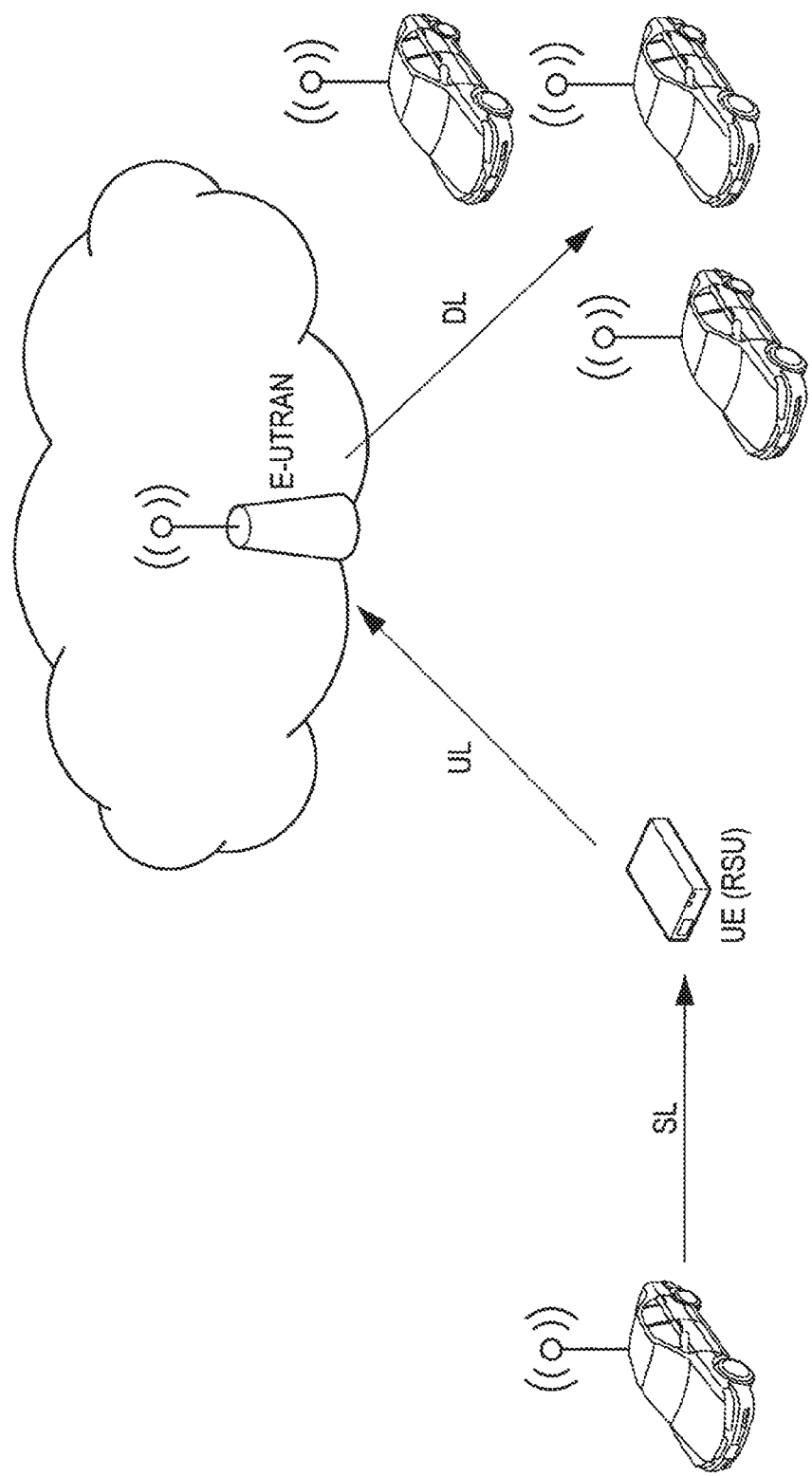
FIG. 3 is an explanatory diagram for explaining a V2X operation scenario.
Figure 4:
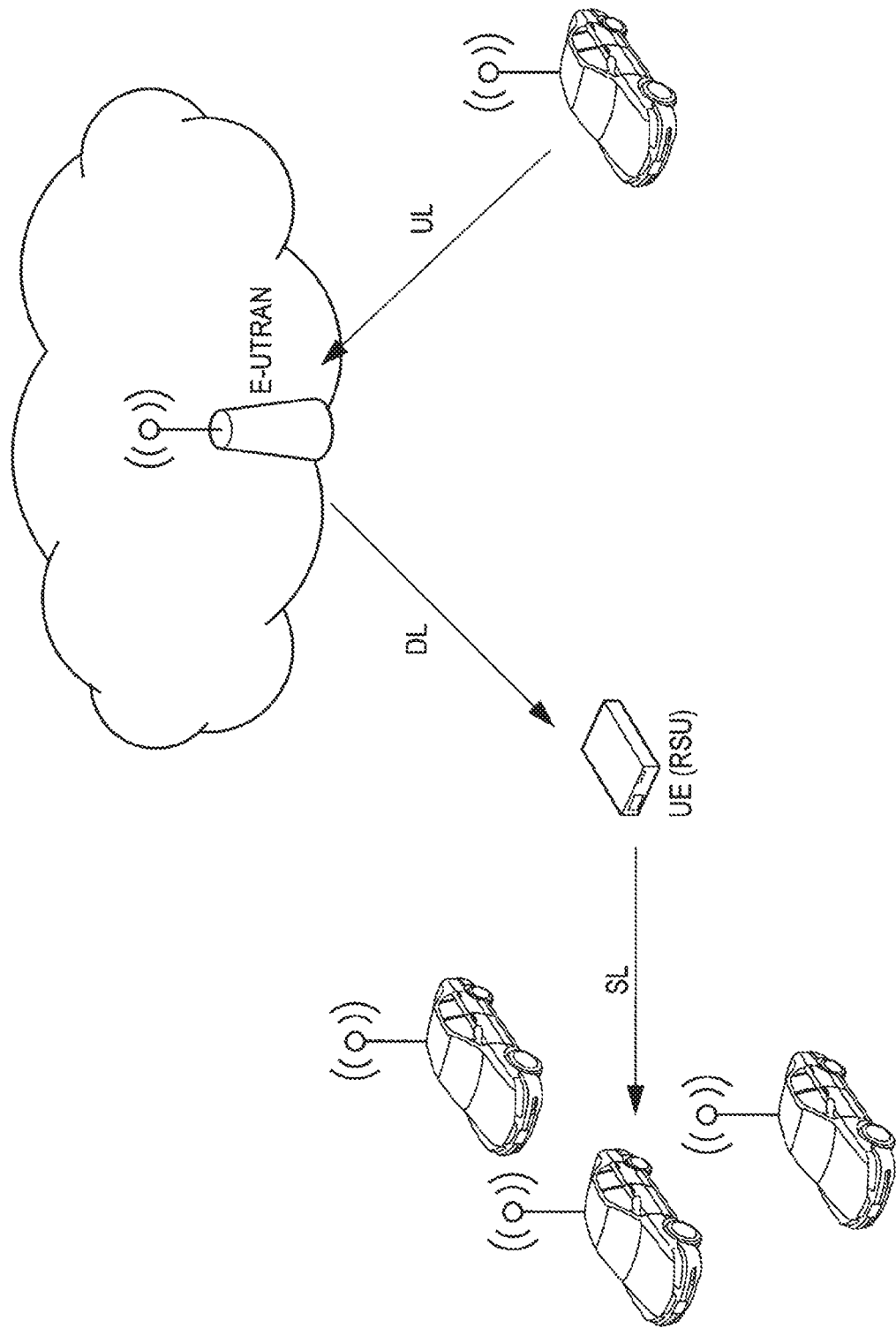
FIG. 4 is an explanatory diagram for explaining a V2X operation scenario.
Figure 5:
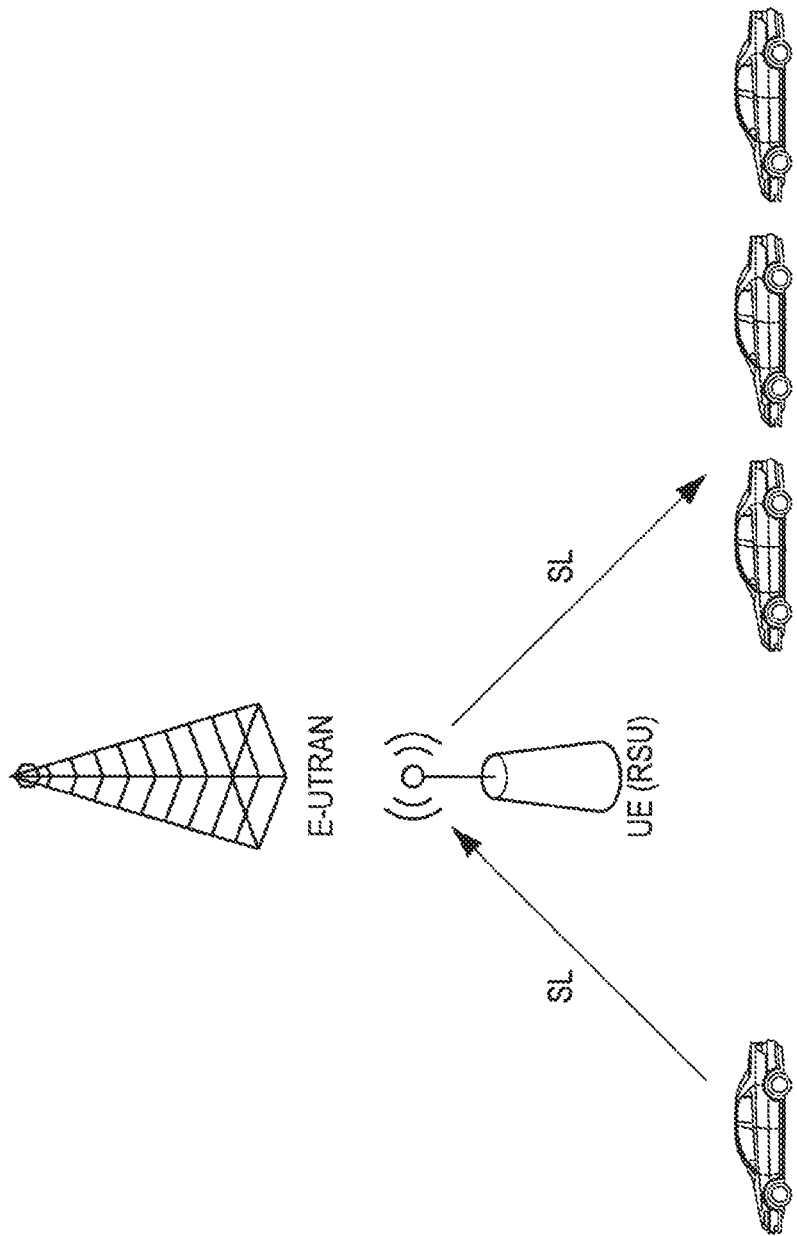
FIG. 5 is an explanatory diagram for explaining a V2X operation scenario.

FIGS. 1 to 5 are explanatory diagrams for explaining the V2X operation scenarios. In FIG. 1 is illustrated a scenario in which vehicles perform direct communication without involving a base station (E-UTRAN). In FIG. 2 is illustrated a scenario in which the vehicles perform communication via a base station. In FIGS. 3 and 4 illustrate scenarios in which vehicles perform communication via a terminal (UE, herein a roadside unit (RSU) and a base station. In FIG. 5 is illustrated a scenario in which vehicles perform communication via a terminal (UE, herein a roadside unit (RSU)).

In the V2X communication according to Rel.14 of 3GPP, only a single component carrier (CC) is used for the V-UE (Vehicle-UE). In Rel.15 of 3GPP, in order to enhance the peak data rate, a multicarrier is provided. In the case of Mode3 of the V2X communication (in the case in which a base station allocates the transmission resources for the V-UE), since a plurality of carriers is present, depending on the V-UE distribution or the service type to be used, the base station can appropriately allocate the carriers to be used in the V-UE. Thus, the base station can coordinate everything, and there is no impact on the specifications with respect to Rel.14. On the other hand, in the case of Mode4 of the V2X communication (in the case in which the transmission resources are selected by the V-UE), before selecting the transmission resources for each carrier, the carriers to be used in transmission need to be decided at the beginning in the V-UE.

Regarding the selection of resources, the differences between Mode3 and Mode4 are laid out below. In the case of Mode3, a base station is entrusted with the entire allocation of the transmission resources. The base station allocates the transmission resources based on the resource usage state in the resource pool. However, if there is a mixture of UEs operating in Mode3 and UEs operating in Mode4 within the coverage of the base station or if there are UEs which are out of coverage of the base station, then the base station cannot get to know about the resources selected by such UEs from the resource pool.

Moreover, the base station does not know the actual transmission power at the time of transmission of data by the UEs. Besides, even if the base station gets to known whether or not resources are being used, it does not have the information about the interference among the UEs. Hence, the base station cannot get hold of the reliable channel busy ratio (CBR).

In contrast, in the case of Mode4, it is possible to measure interference among the UEs. However, although the UEs perform sensing, there are times when the resource usage state cannot be known due to the sensing mode or the decoding error.

In the case of performing carrier aggregation using a multicarrier in Rel.15; in Mode3, the method of Rel.14 can be implemented in each carrier. That is, the base station can always select the vacant resources. In contrast, in Mode4, the carriers need to be decided before selecting the resources. That is because the characteristic features of the carrier affect the sensing result and the resource selection in the V-UE.

In that regard, in view of the issues mentioned above, the discloser(s) of the application concerned performed a thorough study about the technology enabling the terminals involved in inter-device communication to select the appropriate carriers from among a plurality of carriers. The result of the study led the discloser(s) of the application concerned to examine a technology that, as explained below, enables the terminals involved in inter-device communication to select the appropriate carriers from among a plurality of carriers.

1.2. Configuration Example

Figure 6:
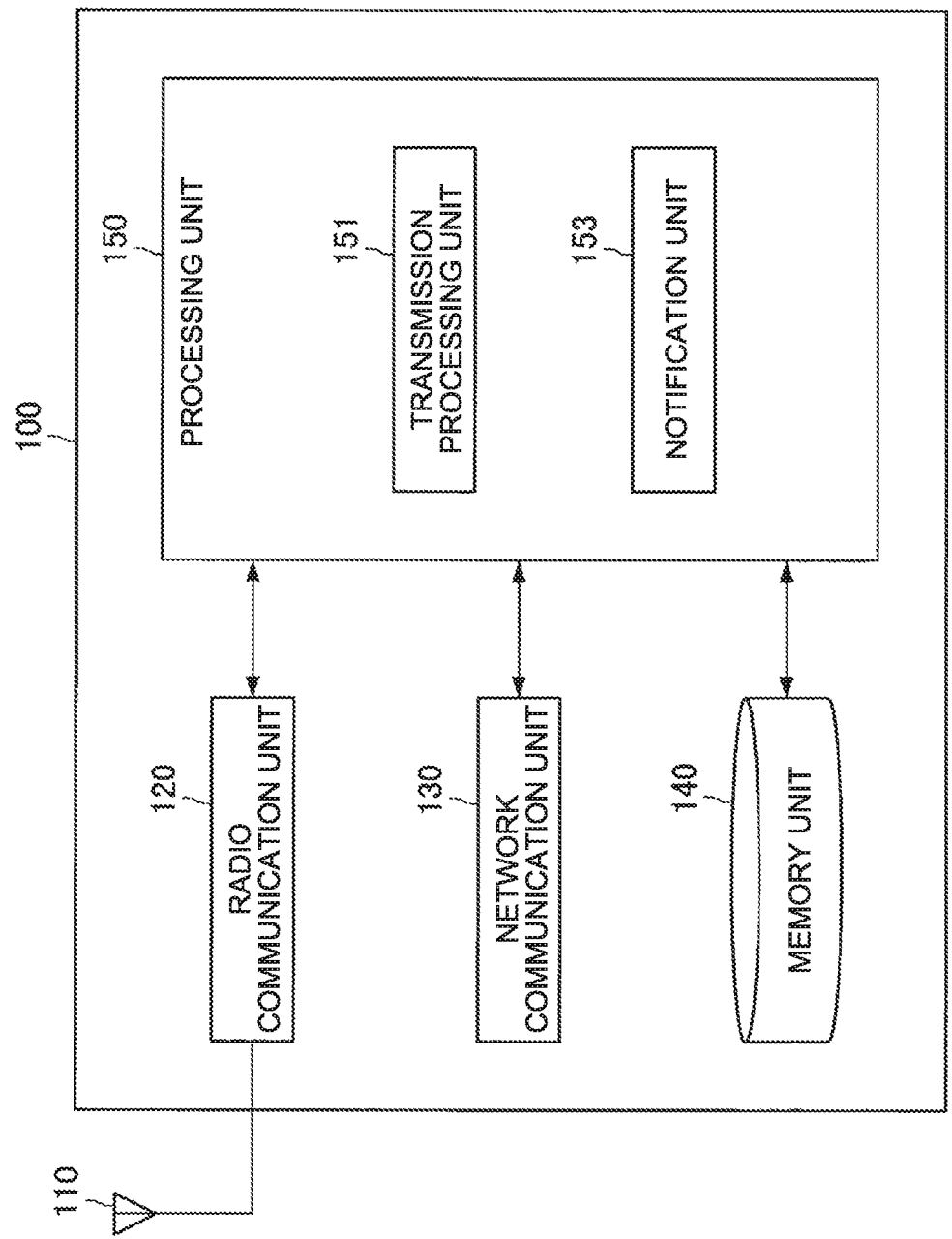
FIG. 6 is a block diagram illustrating an exemplary configuration of a base station 100 according to an embodiment of the application concerned.

Explained below with reference to FIG. 6 is an exemplary configuration of a base station (eNB) 100 according to the embodiment of the application concerned. FIG. 6 is a block diagram illustrating an exemplary configuration of the base station 100 according to the embodiment of the application concerned. With reference to FIG. 6, the base station 100 includes an antenna unit 110, a radio communication unit 120, a network communication unit 130, a memory unit 140, and a processing unit 150.

(1) Antenna Unit 110

The antenna unit 110 radiates, as radio waves into the space, signals output from the radio communication unit 120. Moreover, the antenna unit 110 converts the radio waves present in the space into signals, and outputs those signals to the radio communication unit 120.

(2) Radio Communication Unit 120

The radio communication unit 120 transmits and receives signals. For example, the radio communication unit 120 transmits downlink signals to a terminal device, and receives uplink signals from a terminal device.

(3) Network Communication Unit 130

The network communication unit 130 transmits and receives information. For example, the network communication unit 130 transmits information to other nodes and receives information from other nodes. For example, the other nodes include other base stations and other core network nodes.

(4) Memory Unit 140

The memory unit 140 is used to temporarily or permanently store programs and a variety of data meant to be used in the operations of the base station 100.

(5) Processing Unit 150

The processing unit 150 provides various functions of the base station 100. The processing unit 150 includes a transmission processing unit 151 and a notification unit 153. Moreover, the processing unit 150 can further include other constituent elements other than the constituent elements mentioned above. That is, the processing unit 150 can be configured to perform other operations other than the operations of the constituent elements mentioned above.

The transmission processing unit 151 has the function of performing setting related to the transmission of data to terminal devices 200. Other than that, the transmission processing unit 151 performs the overall processing of the base station (eNB). The notification unit 153 performs the processing related to notifying information to the terminal device 200. That is, the notification unit 153 performs the overall notification processing of the base station (eNB) with respect to terminal devices.

The processing unit 150 can function as an example of a control unit according to the application concerned. With such a configuration, the base station 100 becomes able to perform various operations related to the present embodiment described below, such as allocating the resources to the terminal devices 200, notifying the terminal devices 200 about the information related to the allocated resources, and obtaining information from the terminal devices 200.

Figure 7:
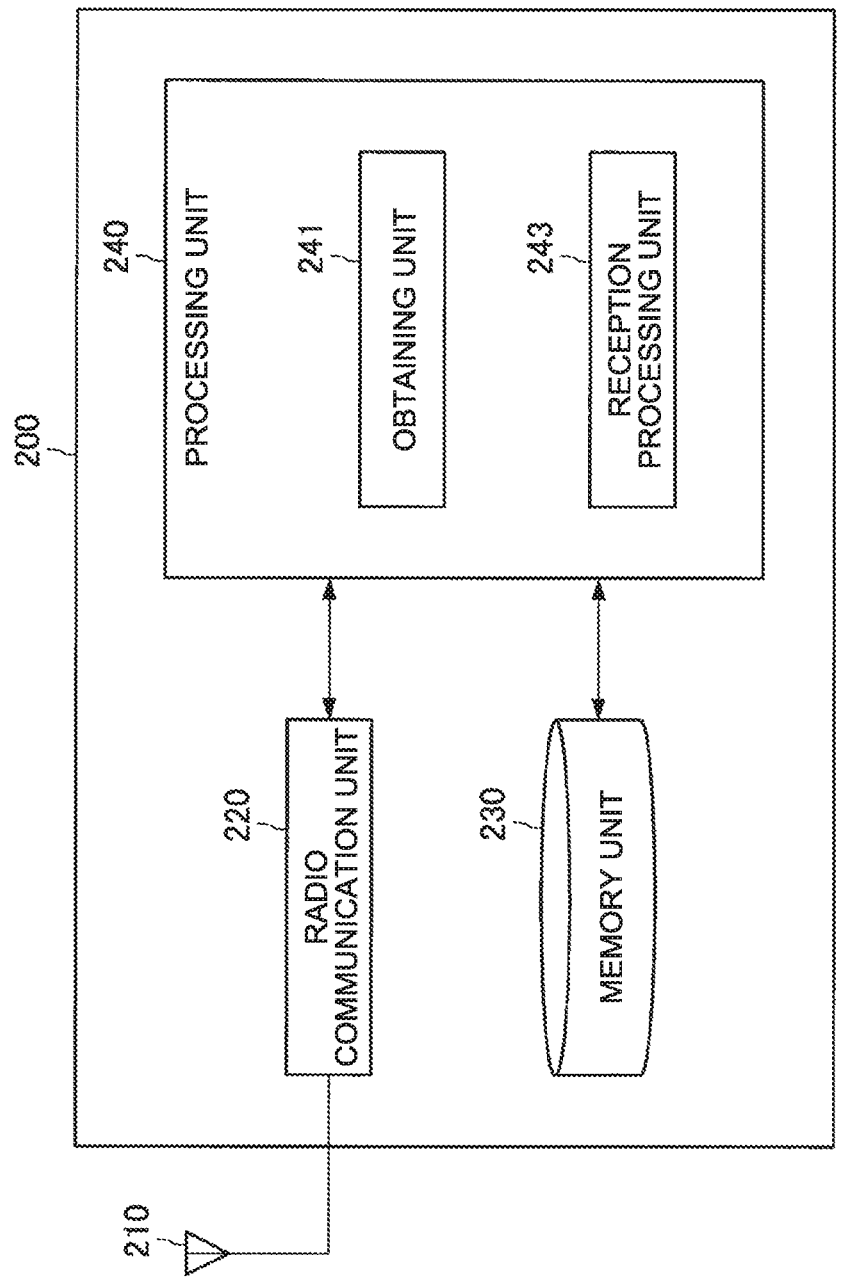
FIG. 7 is a block diagram illustrating an exemplary configuration of a terminal device 200 according to the embodiment of the application concerned.

Explained below with reference to FIG. 7 is an exemplary configuration of the terminal device 200 according to the embodiment of the application concerned. FIG. 7 is a block diagram illustrating an exemplary configuration of the terminal device 200 according to the embodiment of the application concerned. With reference to FIG. 7, the terminal device 200 includes an antenna unit 210, a radio communication unit 220, a memory unit 230, and a processing unit 240.

(1) Antenna Unit 210

The antenna unit 210 radiates, as radio waves into the space, signals output from the radio communication unit 220. Moreover, the antenna unit 210 converts the radio waves present in the space into signals, and outputs those signals to the radio communication unit 220.

(2) Radio Communication Unit 220

The radio communication unit 220 transmits and receives signals. For example, the radio communication unit 220 receives downlink signals from a base station, and transmits uplink signals to a base station.

(3) Memory Unit 230

The memory unit 230 is used to temporarily or permanently store programs and a variety of data meant to be used in the operations of the terminal device 200.

(4) Processing Unit 240

The processing unit 240 provides various functions of the terminal device 200. The processing unit 240 includes an obtaining unit 241 and a reception processing unit 243. Moreover, the processing unit 240 can further include other constituent elements other than the constituent elements mentioned above. That is, the processing unit 240 can be configured to perform other operations other than the operations of the constituent elements mentioned above.

The obtaining unit 241 performs the processing related to obtaining the data transmitted from the base station 100. The reception processing unit 243 performs the processing related to receiving the data obtained by the obtaining unit 241. Moreover, the reception processing unit 243 performs the overall processing of the terminal device.

The processing unit 240 can function as an example of the control unit according to the application concerned. With such a configuration, the terminal device 200 becomes able to perform various operations related to the present embodiment described below, such as securing resources, reserving resources, and transmitting data to other terminal devices and the base station 100.

1.3. Operation Examples (1) Selection of Carriers for Sidelink Transmission from Plurality of Carriers In the present embodiment, the terminal device 200 performs inter-device communication (the V2X communication) Firstly, the explanation is given about an operation of selecting the carriers for Sidelink transmission from among a plurality of carriers in the case in which the terminal device 200 performing inter-device communication is in Mode4 and thus selects the transmission resources on its own.

In Mode4, since the base station 100 does not perform any adjustments, the terminal device 200 needs to have a mechanism for appropriately selecting the carriers. Thus, the terminal device 200 takes into account the load balancing of the carriers and the interference among the carriers. Since there is interference among a plurality of carriers selected by a single terminal device 200 or among the carriers used by a plurality of terminal devices 200, it is desirable that each terminal device 200 minimizes the interference problem at the time of selecting carriers.

At the time of selecting carriers for Sidelink transmission from among a plurality of carriers, when the terminal device 200 selects a plurality of carriers, it is possible to expect an enhancement in the peak data rate at the time of data transmission from the terminal device 200. At the same time, the terminal device 200 needs to decide on the number of carriers to be selected. At the time of selecting carriers for Sidelink transmission from a plurality of carriers, the terminal device 200 decides on the number of carriers to be selected based on the parameters given below.

At the time of selecting carriers for Sidelink transmission from among a plurality of carriers, the terminal device 200 can decide on the number of carriers to be selected based on its own capability. Herein, the capability includes, for example, the number of transmission chains, the maximum transmission power of the terminal device 200, and the supportable frequency bands (for example, the millimeter wavebands). The terminal device 200 can select the carriers by taking into account the central frequency and the bandwidth of the carriers.

Alternatively, the terminal device 200 can decide on the number of carriers to be selected based on the intra-band carrier switching time. If it takes a long time to switch between carriers, it may lead to the problem of latency. For that reason, the terminal device 200 can select the carriers having, for example, a short intra-band carrier switching time.

Still alternatively, the terminal device 200 can decide on the number of carriers to be selected based on the inter-band carrier switching time.

Still alternatively, the terminal device 200 can decide on the number of carriers to be selected based on the capability of the terminal devices 200 at the receiving side, such as based on the severity of the load of sensing the carriers. If a plurality of carriers is selected, then each terminal device 200 at the receiving side needs to perform sensing of a plurality of carriers. Based on the severity of the load of sensing the carriers, the concerned terminal device 200 can decide on the number of carriers to be selected particularly by taking into account the terminal devices 200 having limited battery capacity.

Still alternatively, the terminal device 200 can decide on the number of carriers to be selected based on the attributes of transmission packets. For example, the terminal device 200 can decide on the number of carriers to be selected based on the size of the transmission packets, the latency requirement of the size of the transmission packets, and the type of the transmission packets (such as whether or not the transmission packets have urgency).

Herein, the terminal device 200 either can periodically decide on the number of carriers to be selected for Sidelink transmission from among a plurality of carriers, or can decide on the number of carriers at aperiodic arbitrary timings. In the case of deciding on the number of carriers on a periodic basis, the period can be notified from the base station 100 or can be set in advance in the terminal device 200. In the case of deciding on the number of carriers at aperiodic arbitrary timings, for example, the terminal device 200 can make the decision at the timing of selecting or reselecting the resources, or can make the decision at the time of a change in the service, or can make the decision when entering a new zone (geographical area).

At the time of deciding on the number of carriers to be selected for the Sidelink transmission from a plurality of carriers, the terminal device 200 can make the decision based on its own capability. For example, at the time of deciding on the number of carriers to be selected for the Sidelink transmission from a plurality of carriers, the terminal device 200 can decide on the number of carriers to be selected that does not exceed the number of transmission chains. Alternatively, the terminal device 200 can decide on the number of carriers to be selected by taking into account the maximum transmission power. That is because of the following reason. The total transmission power of the terminal device 200 represents the sum of the transmission power of each carrier. Thus, greater the number of selected transmission carriers, the smaller becomes the maximum transmission power of each carrier. For that reason, if the maximum transmission power falls down to a certain value, there is a risk of not being able to maintain the transmission quality.

At the time of deciding on the number of carriers to be selected for the Sidelink transmission from a plurality of carriers, the terminal device 200 can make the decision by taking into account the switching time. When the switching time becomes longer and the transmission carriers can no more be tuned, the terminal device 200 decides on the number of carriers to be selected in such a way that there is a smaller number of carriers.

At the time of deciding on the number of carriers to be selected for the Sidelink transmission from a plurality of carriers, the terminal device 200 can make the decision by taking into account the attributes of the transmission packets. For example, if the packet size is large and the packets cannot be transmitted within the required time period (latency requirement), the terminal device 200 selects a plurality of carriers. Moreover, there is a possibility of a restriction on the reception chains in the terminal devices 200 at the receiving side. When an important message is to be transmitted, the terminal device 200 selects a plurality of carriers in order to ensure that the message reaches to as many terminal devices 200 as possible at the receiving side.

Figure 8:
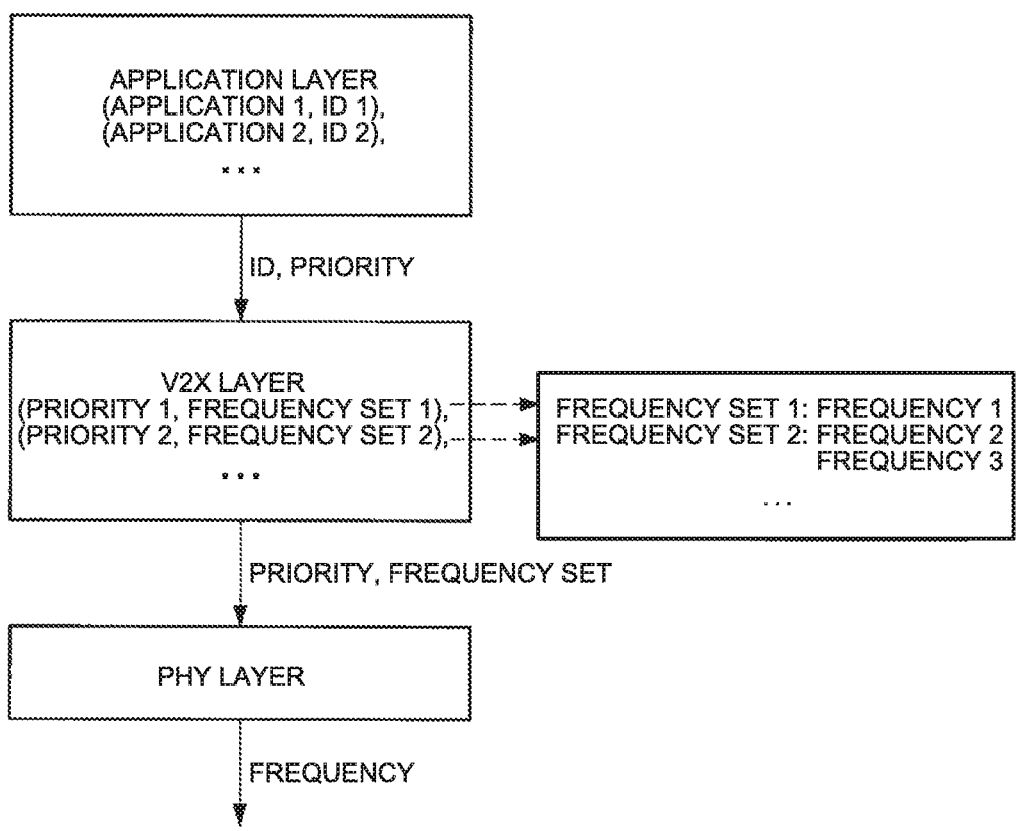
FIG. 8 is an explanatory diagram for explaining the flow of carrier selection performed by the terminal device 200.

Subsequently, at the time of deciding on the number of carriers to be selected for the Sidelink transmission from a plurality of carriers, the terminal device 200 needs to decide on the carriers that should be selected. FIG. 8 is an explanatory diagram for explaining the flow of carrier selection performed by the terminal device 200. There are three layers related to carrier selection, namely an application layer, a V2X layer, and a physical (PHY) layer in the order from the upper layer to the lower layer.

The application layer performs mapping of different IDs according to the V2X services or the types of applications. In the application layer, mapping information such as (V2X application 1, ID1) and (V2X application 2, ID2) is set.

In addition, priority is set for the V2X services and the applications. For example, the services and the applications related to safety issues are set with a high priority, while the services and the applications related to non-safety issues are set with a low priority. In the application layer, information related to the priority is also set.

The V2X layer maps the priority information and the frequency set onto each other. For example, in the V2X layer, mapping such as (priority 1, frequency set 1) and (priority 2, frequency set 2) is set. In a single frequency set, one or more frequency carriers are included. For example, the frequency set 1 includes a frequency carrier 1, and the frequency set 2 includes a frequency carrier 2 and a frequency carrier 3. The V2X layer provides the mapping information to lower-level layers.

In the physical layer, the priority information and the frequency set are received from the upper-level layers, and one or more frequency carriers are selected from the received information.

For example, in the example illustrated in FIG. 8, when information containing the priority 2 and the frequency set 2 is received from the V2X layer, the physical layer is believed to use only some of the frequency carriers. At that time, which of the transmission carriers get selected by the physical layer from the frequency set needs to be taken into account. Cited below are the factors that need to be taken account regarding the selection of the transmission carriers by the physical layer. Particularly, in the case of Mode4, as a result of performing the sensing, the terminal device 200 gets to know local information as well as becomes able to select the carriers based on the attributes of its transmission packets.

The terminal device 200 can select the transmission carriers based on, for example, the CBR (Channel Busy Ratio) of the carriers. The CBR of the carriers represents the parameter indicating the extent of occupation of the radio resources. For example, greater the CBR of a particular carrier, the more is the use of the radio resources of that carrier. Hence, it is desirable that the terminal device 200 does not select that carrier. On the other hand, smaller the CBR of a particular carrier, the lesser is the use of the radio resources of that carrier. Hence, it is desirable that the terminal device 200 selects that carrier.

As the method for measuring the CBR of a carrier, for example, in the same manner as in Rel.14, the terminal device 200 can get to know the CBR of that carrier by performing sensing of that carrier. Moreover, the terminal device 200 can perform sensing on a constant basis (background sensing). If the background sensing of a plurality of carriers is performed, then it is desirable that the terminal device 200 selects the carriers having a small CBR.

Figure 9:
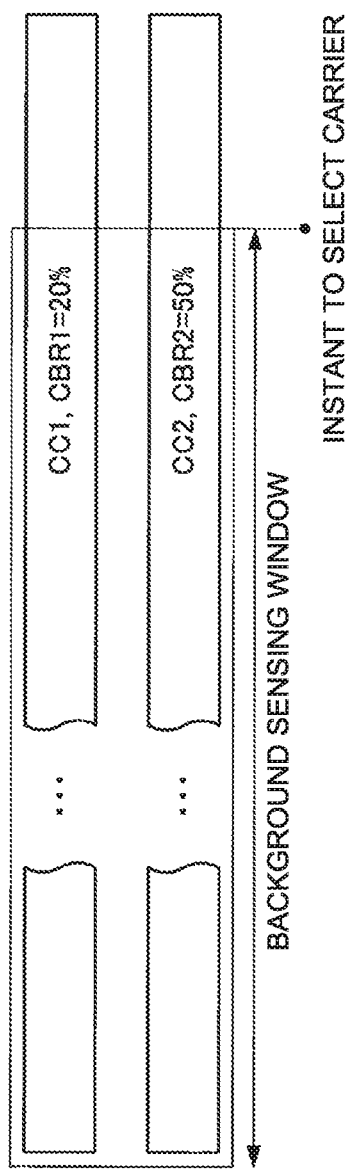
FIG. 9 is an explanatory diagram for explaining a situation in which the terminal device 200 is performing background sensing of two carriers.

FIG. 9 is an explanatory diagram for explaining a situation in which the terminal device 200 is performing background sensing of two carriers. In the example illustrated in FIG. 9, the terminal device 200 is performing background sensing of a carrier 1 (CC1) and a carrier 2 (CC2), and the obtained result indicates that CBR1 representing the CBR of the CC1 is 20% and CBR2 representing the CBR of the CC2 is 50%. Accordingly, the terminal device 200 selects the CC1 because it is more vacant than the CC2.

It is possible to think of a case in which the terminal device 200 can perform background sensing of only a single carrier according to its capability. In that case, the terminal device 200 selects the carrier for which background sensing was performed.

Figure 10:
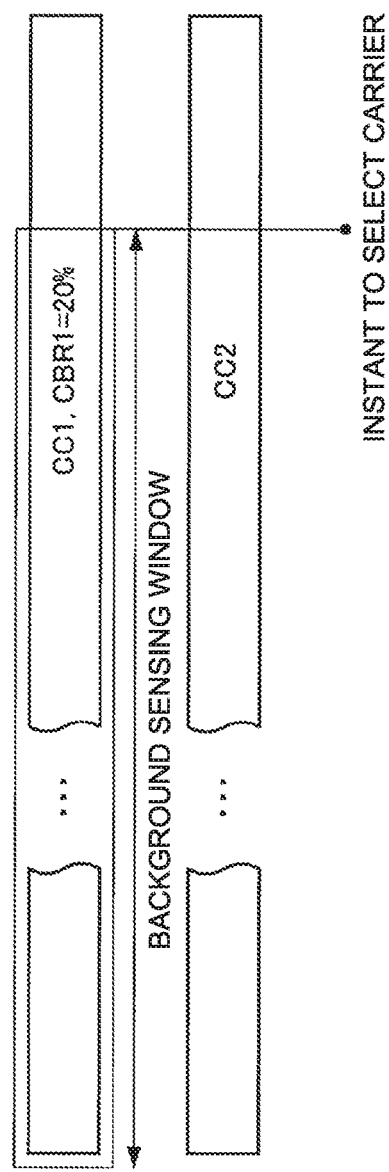
FIG. 10 is an explanatory diagram for explaining a situation in which the terminal device 200 is performing background sensing of a single carrier.

FIG. 10 is an explanatory diagram for explaining a situation in which the terminal device 200 is performing background sensing of a single carrier. In the example illustrated in FIG. 10, the terminal device 200 is performing background sensing of only the carrier 1 (CC1). Accordingly, the terminal device 200 selects the CC1.

In the case in which background sensing of a single carrier is performed, if the CBR is exceeding a certain threshold value, the terminal device 200 can be configured to not select that carrier. The threshold value can be notified from the base station 100, or can be set in advance in the terminal device 200.

In the case in which background sensing is not performed on a constant basis until the timing of carrier selection (referred to as intermediary sensing), in which N number of sub-frames have not passed till the timing of carrier selection, and in which the CBR result is better by K number of times or higher than the CBR of the carriers subjected to background sensing; the terminal device 200 can select the carrier subjected to intermediary sensing. That is, by comparing the result of carrier sensing performed immediately before the carrier selection and the result of carrier sensing performed till a certain point of time before the carrier selection, if the former carrier has better CBR properties than the latter carrier, then the terminal device 200 can select the latter carrier. Such parameters can be notified from the base station 100 using SCI (Sidelink Control Information), or SIB (System Information Block), or RRC (Radio Resource Control); or can be set in advance in the terminal device 200.

Figure 11:
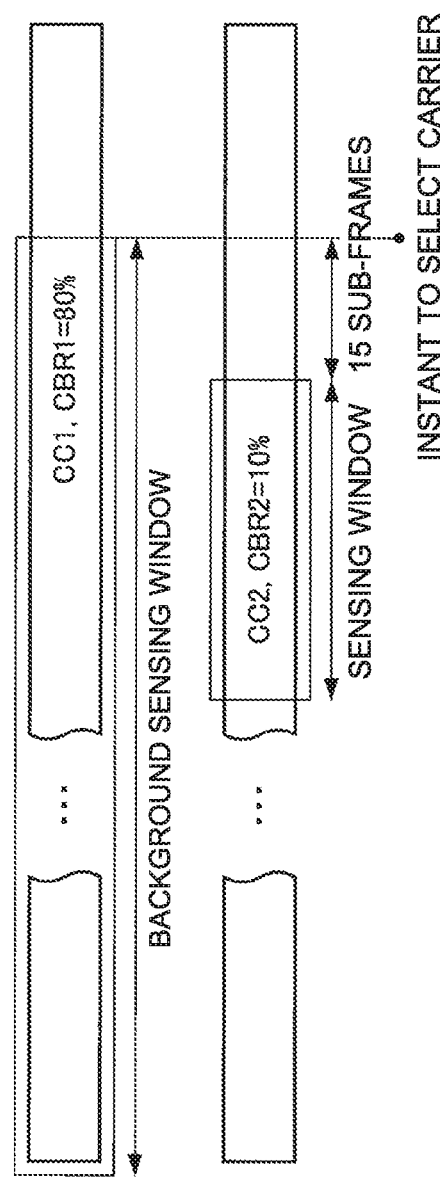
FIG. 11 is an explanatory diagram for explaining an example of carrier selection attributed to background sensing performed by the terminal device 200.

FIG. 11 is an explanatory diagram for explaining an example of carrier selection attributed to background sensing performed by the terminal device 200. In the example illustrated in FIG. 11, the terminal device 200 is performing background sensing with respect to the CC1, and is performing intermediary sensing with respect to the CC2. Moreover, in this case, it is assumed that the threshold value for CBR is 70%, that the time interval between the timing of completion of intermediary sensing and the timing of carrier selection is 20 sub-frames at the most, and that a scale factor K is equal to three times.

In the example illustrated in FIG. 11, the terminal device 200 performs sensing with respect to the CC2 till 15 sub-frames before the timing of carrier selection. Then, at the timing of carrier selection, CBR1 representing the CBR of the CC1 is 80% and CBR2 representing the CBR of the CC2 is 10%. Since the threshold value is 70%, the terminal device 200 does not treat the CC1 as the selection target. Moreover, since CBR1 is eight times CBR2, the terminal device 200 treats the CC2 as the selection target.

There can be times when the terminal device 200 is not performing background sensing with respect to any carrier. In that case, the terminal device 200 can select the carriers in a random manner.

The terminal device 200 can also take into account the intensity of inter-carrier interference as a carrier selection criterion.

In the case of intra-band aggregation, the carriers in a frequency set are present within the same single band. The terminal device 200 selects a plurality of carriers from those carriers, that is, selects a plurality of carriers from that single band. In that case, since there is inter-carrier interference, it is desirable that the terminal device 200 selects the carriers that do not easily interfere with each other. That is, at the time of selecting a plurality of carriers from a single band, the terminal device 200 selects the carriers having weaker interference with each other.

Figure 12:
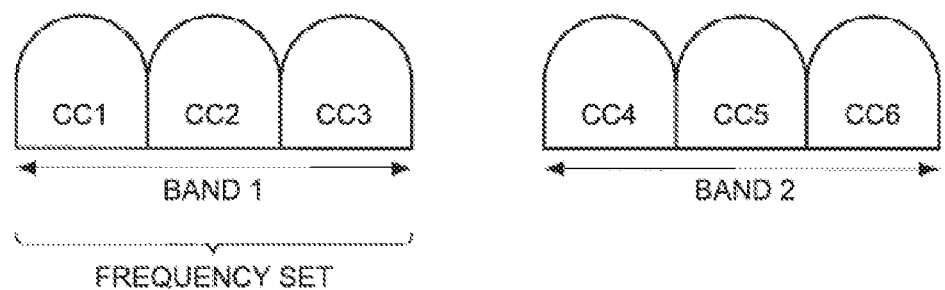
FIG. 12 is an explanatory diagram for explaining the relationship between bands and component carriers.

FIG. 12 is an explanatory diagram for explaining the relationship between bands and component carriers. In the example illustrated in FIG. 12, there are two bands, namely, a band 1 and a band 2; and the band 1 includes component carriers (CCs) from the CC1 to a CC3, and the band 2 includes component carriers (CCs) from a CC4 to a CC6. When the band 1 is selected as the frequency set, if the terminal device 200 selects the CC2, then it results in inter-carrier interference regardless of whether the CC1 or the CC3 is selected as the other component carrier. Thus, it is desirable that the terminal device 200 selects the CC1 and the CC3 by taking into account the inter-carrier interference.

In the case of inter-band aggregation, the carriers in a frequency set are present in one or more bands. The terminal device 200 selects a plurality of carriers from those carriers, that is, selects a plurality of carriers from a plurality of bands. In that case, since there is inter-carrier interference, it is desirable that the terminal device 200 selects the carriers that do not easily interfere with each other. That is, at the time of selecting a plurality of carriers from a plurality of bands, the terminal device 200 selects the carriers having weaker interference with each other.

Figure 13:
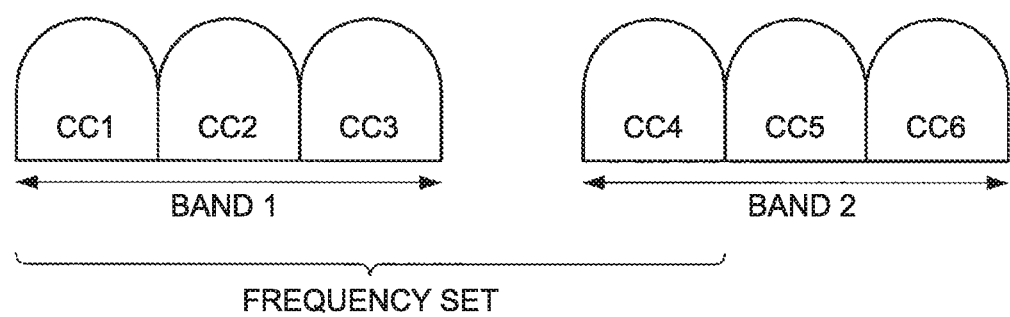
FIG. 13 is an explanatory diagram for explaining the relationship between bands and component carriers.

FIG. 13 is an explanatory diagram for explaining the relationship between bands and component carriers. In the example illustrated in FIG. 13, there are two bands, namely, the band 1 and the band 2; and the band 1 includes component carriers (CCs) from the CC1 to the CC3, and the band 2 includes component carriers (CCs) from the CC4 to the CC6. When the band 1 and the CC4 of the band 2 are selected as the frequency set, it is desirable that the terminal device 200 selects one component carriers from among the CC1 to CC3 by taking into account the inter-carrier interference, as well as selects the CC4.

The terminal device 200 can also take into account the central frequency and the bandwidth of the carriers, and select the carriers less impacted by the IBE (In-Band Emission). That is, at the time of selecting a plurality of carriers, the terminal device 200 selects, with priority, the carriers not easily affected by the IBE. The carriers having a wide bandwidth or the carriers having the guard band have a relatively weaker IBE interference.

Figure 14:
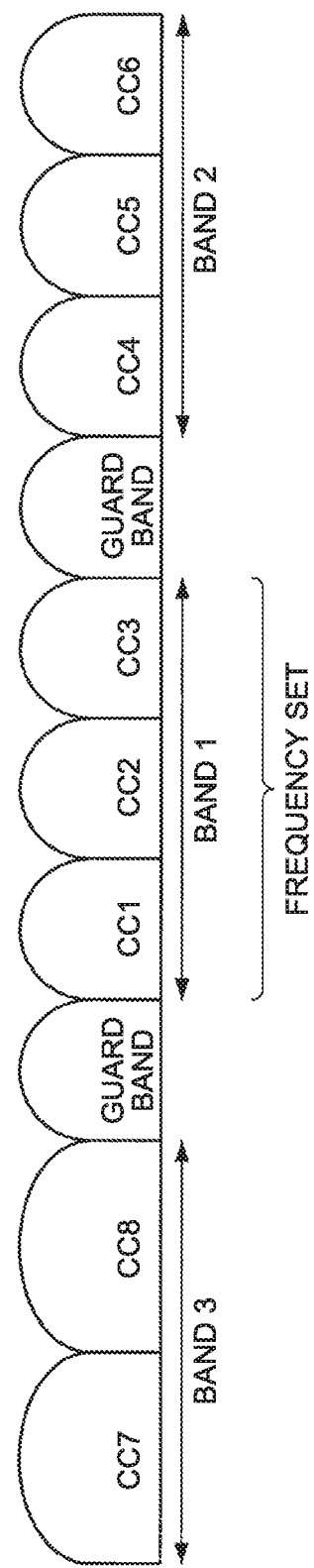
FIG. 14 is an explanatory diagram for explaining the relationship between bands and component carriers.

FIG. 14 is an explanatory diagram for explaining the relationship between bands and component carriers. In the example illustrated in FIG. 14, there are three bands, namely, the band 1 to a band 3; and the band 1 includes component carriers (CCs) from the CC1 to the CC3, the band 2 includes component carriers (CCs) from the CC4 to the CC6, and the band 3 includes component carriers (CCs), namely, CC7 and CC8. Moreover, the guard band is present between the CC8 and the CC1 and between the CC3 and the CC4.

In the example illustrated in FIG. 14, the CC2 is prone to interference of the neighboring CC1 and CC3. On the other hand, the CC1 or the CC3 faces only the IBE interference of the CC2. Hence, as compared to the IBE interference of the CC2, the IBE interference of the CC1 or the CC3 is relatively lower. Hence, it is desirable that the terminal device 200 selects the CC1 or the CC3.

Figure 15:
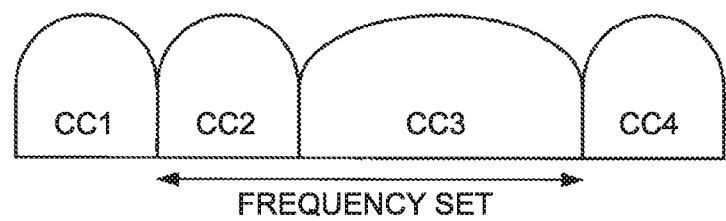
FIG. 15 is an explanatory diagram for explaining an example of component carriers.

FIG. 15 is an explanatory diagram for explaining an example of component carriers. In the example illustrated in FIG. 15, there are four component carriers, namely, the CC1 to the CC4; and the CC2 and the CC3 constitute a single frequency set. In the case illustrated in FIG. 15, the CC1 faces IBE interference of the CC2 or the CC3, and the CC3 faces IBE interference of the CC2 or the CC4. However, since the CC3 has a wider bandwidth as compared to the other component carriers, the effect of the IBE interference of the CC2 and the CC4 becomes weaker. Hence, it is desirable that the terminal device 200 selects the CC3 from the frequency set.

The terminal device 200 can select the carriers by taking into account the level set in the carriers. In the LTE, PCC (Primary Component Carrier) and SCC (Secondary Component Carrier) are defined. In regard to Uulink, the terminal device 200 performs RRS/NAC procedure and measurement reporting in the PCC. In the case of Sidelink, it is believed that important messages such as SLSS/PSBCH are transmitted using the PCC, and it is desirable that at least the PCC is selected.

In the LTE, only the high-priority carriers (PCC) and the low-priority carriers (SCC) are defined. However, depending on the type of services or applications, there is also a possibility that the priority level of the carriers is subdivided further. Moreover, even if the traffic is of the same type of services or applications, it is believed that level differences are assigned thereto. Thus, at the time of selecting the carriers, it is desirable that the terminal device 200 takes into account the levels or the priority information of the carriers. Regarding the setting of the levels, the setting can be notified from a network or can be set in advance in the terminal device 200.

The terminal device 200 can select the carriers by taking into account the anchor carrier. Herein, the anchor carrier implies the carrier that is invariably used at the transmitting side as well as at the receiving side. The transmitting side essentially transmits the important messages using the anchor carrier so as to ensure that the messages are received without fail at the receiving side. When the terminal device 200 selects a different carrier, there is a risk of a carrier mismatch thereby not enabling mutual communication. Particularly, in the case of transmitting important information in Sidelink, for example, when transmitting synchronization signals (SLSS/PSBCH) or important messages (vital V2X messages), the issue of carrier mismatch needs to be resolved. In order to resolve that issue, the use of the anchor charrier is being studied.

The anchor carrier can be set in common among all terminal devices 200, or can be individually set for each cell or each zone. Moreover, the anchor carrier can be set over a long term, or can be set in a dynamic manner. Furthermore, either a single entire component carrier can be set as the anchor carrier, or one of a plurality of sub-bands obtained by subdividing a component carrier can be set as the anchor carrier. When the anchor carrier is included in the frequency set, it is desirable that the terminal device 200 at the transmitting side selects the anchor carrier.

In this way, there can be a plurality of criteria for carrier selection. Thus, at the time of selecting carriers based on a plurality of criteria, it is desirable that the terminal device 200 determines which criterion is to be taken into account as the main criterion. At the time of selecting carriers based on a plurality of criteria, it is desirable that the terminal device 200 decides on the main criterion based on the order of priority set with respect to the criteria, and then decide on the carriers to be selected based on the main criterion. If it is not possible to select carriers based on the criterion having the top position, then the terminal device 200 can decide on the carriers to be selected based on the criterion having the next position.

Meanwhile, at the time of selecting carriers based on a plurality of criteria, the terminal device 200 can set a score for each criterion. Then, the terminal device can calculate the weighted average with respect to the terminal device 200, and decide on the carriers to be selected.

The order of priority and the scores of the criteria can be individually set in each terminal device 200, or can be set in common among all terminal devices 200. Moreover, the information about the order of priority and the scores of the criteria can be notified from the base station 100 using the SCI, or the SIB, or the RRC; or can be set in advance in each terminal device 200.

For example, assume that three types of priority, namely, high, middle, and low are defined. Moreover, assume that the order of priority is set in the order of the CBR, the IBE, and the carrier level. At the time of selecting a carrier, the terminal device 200 firstly selects the carrier having the lowest CBR, that is, the most vacant carrier. If there is a plurality of carriers having the same CBR, the terminal device 200 evaluates the strength of the IBE. If there is a plurality of carriers having the same IBE, the terminal device 200 further evaluates the carrier levels, and eventually selects a carrier. Cited below are two cases in the form of tables.

TABLE 1

(Table 1: State of each carrier at time of carrier selection, case 1)

| Carrier number | CBR | IBE | Carrier level |
|---|---|---|---|
| 1 | 20% | 50 dBm | Level 2 |
| 2 | 50% | 50 dBm | Level 2 |
| 3 | 50% | 20 dBm | Level 1 |

TABLE 2

(Table 2: State of each carrier at time of carrier selection, case 2)

| Carrier number | CBR | IBE | Carrier level |
|---|---|---|---|
| 1 | 50% | 50 dBm | Level 2 |
| 2 | 50% | 50 dBm | Level 2 |
| 3 | 50% | 20 dBm | Level 1 |

In the case 1, the carriers 2 and 3 are more congested as compared to the carrier 1. Since the CBR represents the topmost determination condition, the terminal device 200 selects the carrier 1. In the case 2, since all three carriers have the same CBR, the terminal device 200 compares the IBE representing the next determination condition, and as a result selects the carrier 3 having the weakest interference.

Meanwhile, regardless of the number of criteria for carrier selection, in case all terminal devices 200 select the most appropriate carriers, then only the carriers having the most favorable conditions get selected thereby leading to congestion, and thus the other carriers remain vacant. Hence, it is desirable that the terminal device 200 selects the carriers by taking into account the load balancing.

In that regard, at the time of selecting the carriers by taking into account the load balancing, the terminal device 200 can set, for example, candidate carriers. More particularly, the terminal device 200 sets the candidate carriers according to the following: its own capability and attributes (the transmission power, the speed, and the UE category); the transmission packet requirements (the latency and the reliability); and the transmission target (a vehicle, a pedestrian, an infrastructure, or a network). The UE categories include smartphone and narrowband IoT (NB-IoT). Depending on the UE category, the resource blocks usable at the time of transmission differ. Moreover, depending on the transmission target, the magnitude of the Doppler effect also differs according to the speed. Thus, the terminal device 200 can set the candidate carriers based on such information.

For example, at the time of selecting carriers based on the CBR, when the CBR value reaches a certain threshold value $\gamma$, the terminal device 200 sets the carriers as candidate carriers. There can be only one value of $\gamma$, or there can be a plurality of values of $\gamma$ depending on the services of the transmission packets and the types of applications. The value of $\gamma$ can be notified from the base station 100 using DCI, RRC, or SIB; or can be set in advance in the terminal device 200. Alternatively, the terminal device 200 can set the threshold value $\gamma$ on its own. In that case, all terminals devices 200 or the terminal devices 200 inside the same zone can use the same threshold value $\gamma$, or each terminal device 200 can individually set the threshold value $\gamma$. For example, it is desirable that the terminal devices 200 which transmit packets having strict requirements (low-latency and high-reliability packets) or the terminal devices 200 having low transmission power set a smaller threshold value $\gamma$.

For example, assume that there are three component carriers, namely, CC1, CC2, and CC3 having the CBR to be equal to 20%, 40%, and 60%, respectively. Moreover, assume that there are two terminal devices 200, one of which (referred to as UE1) transmits packets having the dependability requirement of 99% at low electrical power and the other (referred to as UE2) transmits packets having the dependability requirement of 95% at a relatively higher electrical power. The UE1 has the CBR tolerance set to 40%, and the UE2 has the CBR tolerance set to 60%. In that case, the UE1 selects carriers from among the CC1 and the CC2, while the UE2 selects carriers from among the CC1, CC2, and CC3.

At the time of selecting the carriers by taking into account the load balancing, the terminal device 200 can, for example, rank the carriers. The terminal device 200 selects the rank according to the service type of the transmission packets, the reliability and the delay requirements of the packets, and the parameters related to resource selection (for example, frequency hopping). The selection method can be notified from the base station 100, or can be set in the terminal device 200 in advance. In a single rank, there can be one or more carriers. When a rank having a plurality of carriers is selected, the terminal device 200 further needs to select one of the carriers. At that time, the terminal device 200 can select the carrier in a random manner, or can select the carrier by taking into account the abovementioned criteria as the definitive parameters.

For example, assume a case in which five component carriers, namely, CC1, CC2, . . . , CC5 are present in a single frequency set. Moreover, assume that the five carriers are divided into two ranks, as given below in Table 3, by taking into account either the CBR, or the carrier level, or the inter-carrier interference, or all of those criteria.

TABLE 3

(Table 3: Example of correspondence between ranks and carriers)

| Rank | Carrier number | CBR | IBE | Carrier level |
|---|---|---|---|---|
| 1 | 1 | 20% | 50 dBm | Level 2 |
|   | 2 | 40% | 30 dBm | Level 2 |
| 2 | 3 | 40% | 20 dBm | Level 1 |
|   | 4 | 20% | 80 dBm | Level 1 |
|   | 5 | 30% | 50 dBm | Level 2 |

For example, assume that there are three terminal devices 200 referred to as UE1, UE2, and UE3. The UE1 and the UE2 transmit safety-related packets, and the UE3 transmits non-safety-related packets. In that case, the UE1 and the UE2 select carriers from the rank 1, and the UE3 selects a carrier from the rank 2. At the time of selecting a carrier belonging to a rank, a UE can select a carrier on a random basis or can select a carrier according to its own selection criteria. For example, assume that the UE1 has the CBR as the carrier selection criterion, and the UE2 has the IBE has the carrier selection criterion. In that case, the UE1 selects the carrier 1, and the UE2 selects the carrier 3.

(2) Allocation of the Transmission Power at the Time of Selecting a Carrier from a Plurality of Carriers Given below is the explanation of the operation of allocating the transmission power at the time when the terminal devices 200 performing inter-device communication select carriers for transmission.

In Rel.14, regarding the transmission power in the V-UE, the transmission is performed either at the maximum electrical power or at the electrical power calculated using the propagation loss between the base station and the UE and using the number of resource blocks for transmission. When the UE performs concurrent transmission using a plurality of carriers, the calculation of the transmission power of each carries is same as in Rel.14. Thus, the total transmission power of the terminal device 200 is likely to exceed its maximum transmission power, and thus the transmission power of each carrier needs to be allocated in an appropriate manner.

Moreover, in the case of performing concurrent transmission using a plurality of carriers, even if the total transmission power is not exceeding the maximum transmission power, in order to hold down the interference of other carriers, it is necessary to adjust the transmission power. For example, there are times when safety-related messages having high priority are transmitted using different carriers than the carriers meant for transmitting non-safety-related messages having relatively lower priority. In that case, it is desirable to hold down the impact of the low-priority carriers on the high-priority carriers.

Figure 16:
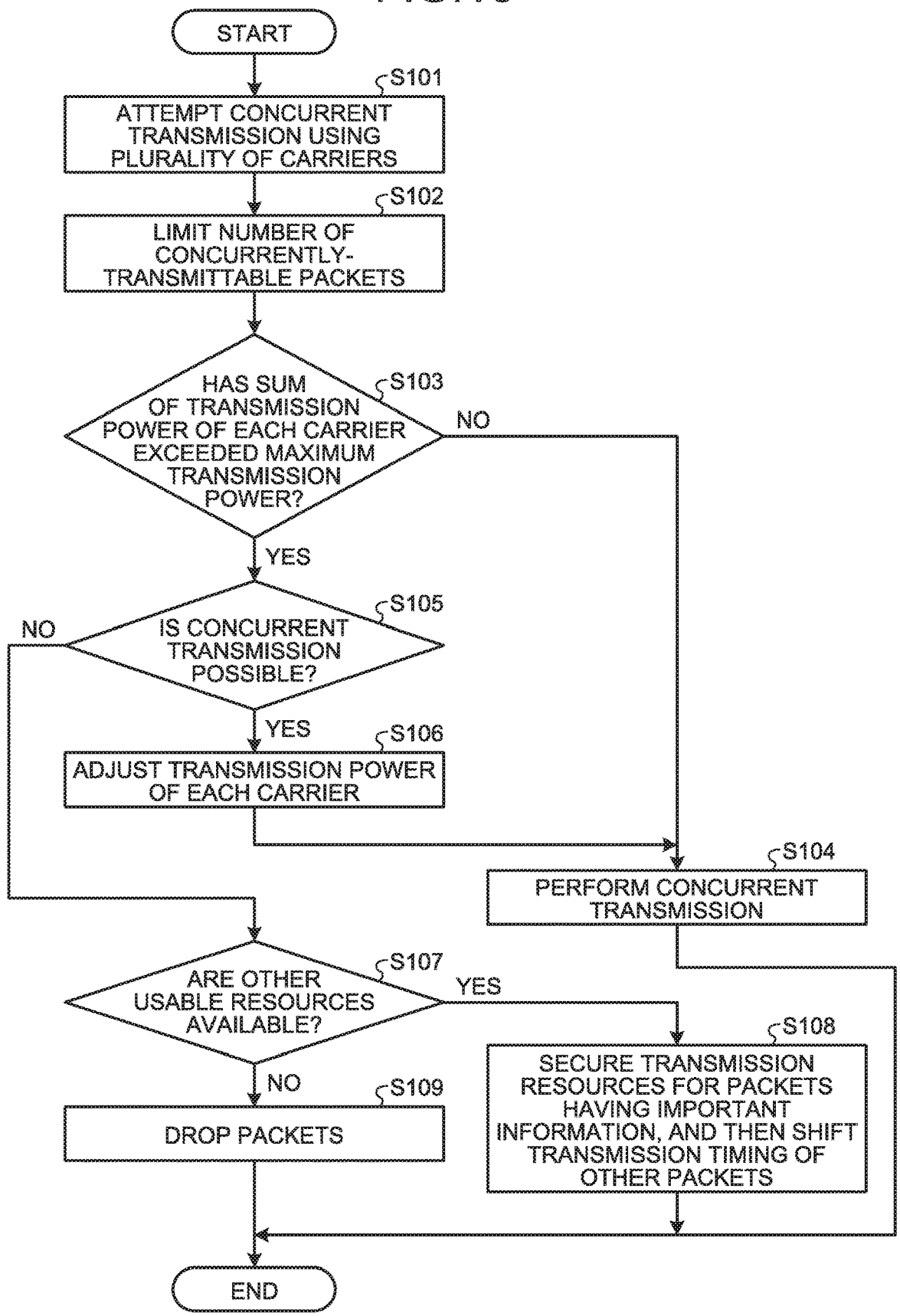
FIG. 16 is a flowchart for explaining an example of the operations performed by the terminal device 200.

In that regard, the explanation is given about an allocation operation performed by the terminal device 200 for allocating the transmission power. FIG. 16 is a flowchart for explaining an example of the operations performed by the terminal device 200 according to the embodiment of the application concerned. In FIG. 16 is illustrated an example of the allocation operation performed by the terminal device 200, which is involved in inter-device communication, for allocating the transmission power to each carrier at the time of selecting carriers for transmission.

In the case of attempting concurrent transmission using a plurality of carriers (Step S101), the terminal device 200 limits the number of concurrently-transmittable packets (Step S102). Then, the terminal device 200 determines whether or not the sum of the transmission power of each carrier has exceeded its maximum transmission power (Step S103).

If it is determined at Step S103 that the sum of the transmission power of each carrier has not exceeded the maximum transmission power (No at Step S103), then the terminal device 200 performs concurrent transmission of packets (Step S104).

When the sum of the transmission power of each carrier is not exceeding the maximum transmission power, if the terminal device 200 need not perform transmission at the maximum transmission power or if transmission at the maximum transmission power is not desirable, the terminal device 200 can perform transmission at a lower electrical power than the maximum transmission power. For example, in the case in which the terminal device 200 transmits non-safety-related packets having low requirements for reliability and latency, if such packets are receivable even if transmitted at a lower electrical power than the maximum transmission power, then it is desirable that the transmission power of the terminal device 200 is set to be lower than the maximum transmission power. Moreover, for example, when there is no congestion of carriers, it is desirable that the transmission power of the terminal device 200 is set to be lower than the maximum transmission power. If the transmission is performed at a lower electrical power, then it becomes possible to hold down the interference (inter-UE interference) among the terminal devices 200 performing transmission.

On the other hand, if it is determined at Step S103 that the sum of the transmission power of each carrier has exceeded the maximum transmission power (Yes at Step S103), then the terminal device 200 determines whether or not concurrent transmission of packets is possible (Step S105).

Explained below is an example of determining whether or not concurrent transmission of packets is possible. For example, if a plurality of safety-related packets is concurrently transmitted, then there is a possibility at the receiving side that not all of the safety-related packets can be received due to capability and half duplex. Thus, in order to ensure that the packets having important information are receivable as much as possible at the receiving side, the terminal device 200 limits the number of concurrently-transmittable packets to a count m. The packets having important information include, for example, the packets having high priority and the safety-related packets. The setting of the count m of the concurrently-transmittable packets can be notified from the base station, or can be set in advance in the terminal device 200, or can be set by the terminal device 200 on its own.

If the number of concurrently-transmittable packets having important information exceeds the count m, then the terminal device 200 can randomly decide on the packets to be transmitted at a different timing. Then, the randomly-decided packets are transmitted after the elapse of a predetermined time (after the elapse of a predetermined number of sub-frames) since the timing of transmission of the m number of packets.

If the total transmission power of the multicarrier state exceeds the maximum transmission power of the terminal device 200, then it becomes necessary for the terminal device 200 to lower the electrical power of certain carriers. However, if the transmission power is lowered to be equal to or lower than a predetermined threshold value β (the minimum transmission power for carriers), then there is a risk that the reception quality cannot be maintained at the receiving side. In that case, the terminal device 200 stops performing concurrent transmission. The setting of the threshold value β can be notified from the base station, or can be set in advance in the terminal device 200, or can be set by the terminal device 200 on its own. Moreover, there can be a plurality of threshold values β. Thus, different carriers can have different threshold values β depending on the following: the CB of the carriers, the level or the priority information of the carriers, the attributes (the PCC, the SCC, or the anchor carrier) of the carriers, the types of packets and services transmitted using the carriers, the central frequency of the carriers, the bandwidth of the carriers, and the IBE.

For example, if the terminal device 200 has the maximum power transmission of 23 dBm and if there are three component carriers Cl, CC2, and CC3, then the terminal device 200 can perform transmission at the transmission power of 23 dBm in each carrier when not performing concurrent transmission. In that case, when the threshold value β is 7 dBm and when it is attempted to perform concurrent transmission in three carriers, the terminal device 200 can perform transmission at the transmission power of 7 dBm in each carrier.

Alternatively, assume that two threshold values β are set and that the safety-related packets have the minimum transmission power of 15 dBm and the non-safety-related packets have the minimum transmission power of 3 dB. That is, assume that two threshold values β are set; and that β1=15 dBm holds true and β2=3 dBm holds true. Moreover, assume that there are three component carriers CC1, CC2, CC3 among which the CC1 is a carrier for safety-related packets and the CC2 and the CC3 are carriers for non-safety-related packets. In that case, the terminal device 200 sets the transmission power to 17 dBm for the packets to be transmitted in the CC1, and sets the transmission power to 3 dBm for the packets to be transmitted in the CC2 and the CC3.

If it is determined at Step S105 that concurrent transmission is possible (Yes at Step S105), then the terminal device 200 adjusts the transmission power for each carrier (Step S106) and performs concurrent transmission (Step S104). In the case of continuing with concurrent transmission, the terminal device 200 can lower the transmission power of at least one carrier or the transmission power of a plurality of carriers, or can raise the transmission power of one or more carriers to a level not exceeding the maximum transmission power of the terminal device 200. Regarding the carriers for which the transmission power is to be raised or lowered, the decision can be made by taking into account one or more of the following factors, for example: the priority of the carriers, the CBR of the carriers, the ranking of the carriers, the attributes of the carriers, the carrier frequency (inter-band as well as intra-band), the IBE, the requirements about the packets to be transmitted, the attributes of the packets to be transmitted, and the speed of the terminal device 200. As far as the priority of the carriers is concerned, whether a carrier is a PCC or an SCC can be taken into account. As far as the attributes of the carriers are concerned, the central frequency and the bandwidth of the carriers can be taken into account. As far as the requirements about the packets to be transmitted are concerned; the latency, the reliability, the MCS (Modulation and Coding rate) can be taken into account. As far as the attributes of the packets to be transmitted are concerned, the priority of the packets or the types of services/applications can be taken into account. Moreover, the reason for taking into account the speed of the terminal device 200 is because it is concerned with the reception range at the receiving side.

Meanwhile, if it is determined at Step S105 that concurrent transmission is not possible (Yes at Step S105), then the terminal device 200 determines whether or not other usable resources are available (Step S107). If other usable resources are available (Yes at Step S107), the terminal device 200 secures the transmission resources for the packets having important information and then shifts the transmission timing of other packets (Step S108). For example, the terminal device 200 shifts the transmission timing of the transmission packets of a particular carrier by x number sub-frames, and performs transmission later. At that time, there is limitation on the number of concurrently-transmittable safety-related packets or the number of concurrently-transmittable high-priority packets; and, when the transmission timing is shifted, the terminal device 200 firstly secures the transmission resources of such packets. In the case of shifting the packets transmitted in a plurality of carriers, the terminal device 200 can set a different count x for each carrier. The terminal device 200 can decide on the count x according to the sensing result.

On the other hand, if other usable resources are available (No at Step S107), then the terminal device 200 drops the packets (Step S109). The terminal device 200 decides on the packets to be dropped by taking into account the attributes of the transmission packets. For example, the terminal device 200 decides on the packets to be dropped by taking into account the type, the priority, and the requirement of the messages. Meanwhile, when it is not possible to shift the transmission timing of the transmission packets, such as when there are no available resources other than the current sub-frames, the terminal device 200 drops those transmission packets too. Regarding the dropping of packets, if the same packets are dropped on a constant basis, there are times when the latency requirements are not satisfied. Particularly, since the packets having low priority are prone to be dropped, there is a risk of a decline in the reception success rate of the packets having low priority. In that regard, it is desirable that the same packets are avoided from being dropped consecutively for M number of times. The value pf the maximum consecutive drop count M can be set by the base station 100, or can be set by the terminal device 200 according to the service type of the transmission packets or the attributes of the carriers.

For example, if the terminal device 200 has the maximum transmission power of 23 dBm and if there are three component carriers Cl, CC2, and CC3; then the terminal device 200 can perform transmission at the transmission power of 23 dBm in each carrier when not performing concurrent transmission. In that case, when the threshold value β is equal to 10 dBm, the terminal device 200 cannot perform concurrent transmission in the three carriers. Hence, the terminal device 200 transmits safety-related packets in the CC1, and transmits non-safety-related packets in the CC2 and the CC3. Since concurrent transmission is not possible, the terminal device 200 shifts the packet transmission timing of either one of or both the CC2 and the CC3, or drops the concerned transmission packets.

Given below is the explanation about the selection of carriers at the receiving side. The terminal device 200 has limitation on the transmission capability and the reception capability. Hence, if different carriers are selected, then the terminal device 200 can no more receive the data because of carrier mismatch. In the present embodiment, the mismatch is resolved in the manner explained below.

1) Coordination of Base Station or Infrastructure (for Example, RSU)

This method is applicable when the terminal device 200 at the transmitting side as well as the terminal device 200 at the receiving side is in coverage. Upon selecting the transmission carriers, the terminal device 200 at the transmitting side notifies the base station 100 (or the network infrastructure) about the selected carriers. Then, the base station 100 (or the network infrastructure) notifies the terminal device 200 at the receiving side about that information. Thus, the terminal device 200 at the receiving side can search for the selected carriers and receive the data.

2) Reception Upon Selecting Particular Carriers

There are times when the terminal device 200 at the transmitting side or the terminal device 200 at the receiving side is out of coverage. In that case, the base station 100 (or the network infrastructure) cannot perform carrier coordination. In that regard, the terminal device 200 at the receiving side selects particular carriers and performs reception. Examples of the particular carriers include the anchor carrier, high-priority carriers, and high-level carriers. Since such carriers are basically used to send important information, by selecting such carriers as the reception carriers, the terminal device 200 at the receiving side becomes able to receive important information.

3) Blind Selection

If the anchor carrier, or high-priority carriers, or high-level carriers are not set, the terminal device 200 at the receiving side can select the receiving carriers only in a blind manner. However, if the terminal device 200 at the receiving side selects the same carriers on a constant basis, particularly when the carriers not used for sending important information are selected, it results in the loss of important information. Hence, the terminal device 200 at the receiving side needs to keep changing the reception carriers. For example, the terminal device 200 at the receiving side can periodically select new carriers. Moreover, after selecting particular carriers, if the carrier quality is poor and if the information cannot be received within a predetermined period of time, then the terminal device 200 at the receiving side can select new carriers.

2. APPLICATION EXAMPLES

The technology according to the application concerned is applicable in various products. For example, the base station 100 can be implemented as any type of an eNB (evolved Node B), such as a macro eNB or a small eNB. A small eNB can be an eNB such as a pico eNB, a micro eNB or a home (femto) eNB covering cells smaller than macro cells. Alternatively, the base station 100 can be implemented as another type of base station such as a NodeB or a BTS (Base Transceiver Station). The base station 100 can include a main body (also called a base station device) for controlling radio communication, and one or more RRHs (Remote Radio Heads) disposed at different locations than the main body. Still alternatively, various types of terminals described later can operate as the base station by implementing the base station functions either temporarily or semi-permanently.

Meanwhile, for example, each terminal device 200 can be implemented as a mobile device such as a smartphone, a tablet PC (Personal Computer), a note PC, a portable game terminal, a portable-type/dongle-type mobile router, or a digital camera; or can be implemented as an in-vehicle terminal such as a car navigation device. Alternatively, the terminal devices 200 can be implemented as terminals performing M2M (Machine To Machine) communication (also called MTC (Machine Type Communication) terminals). Still alternatively, the terminal devices 200 can be radio communication modules (for example, integrated circuit modules configured using a single die) installed on such terminals.

2.1. Application Example Related to Base Station

First Application Example

Figure 17:
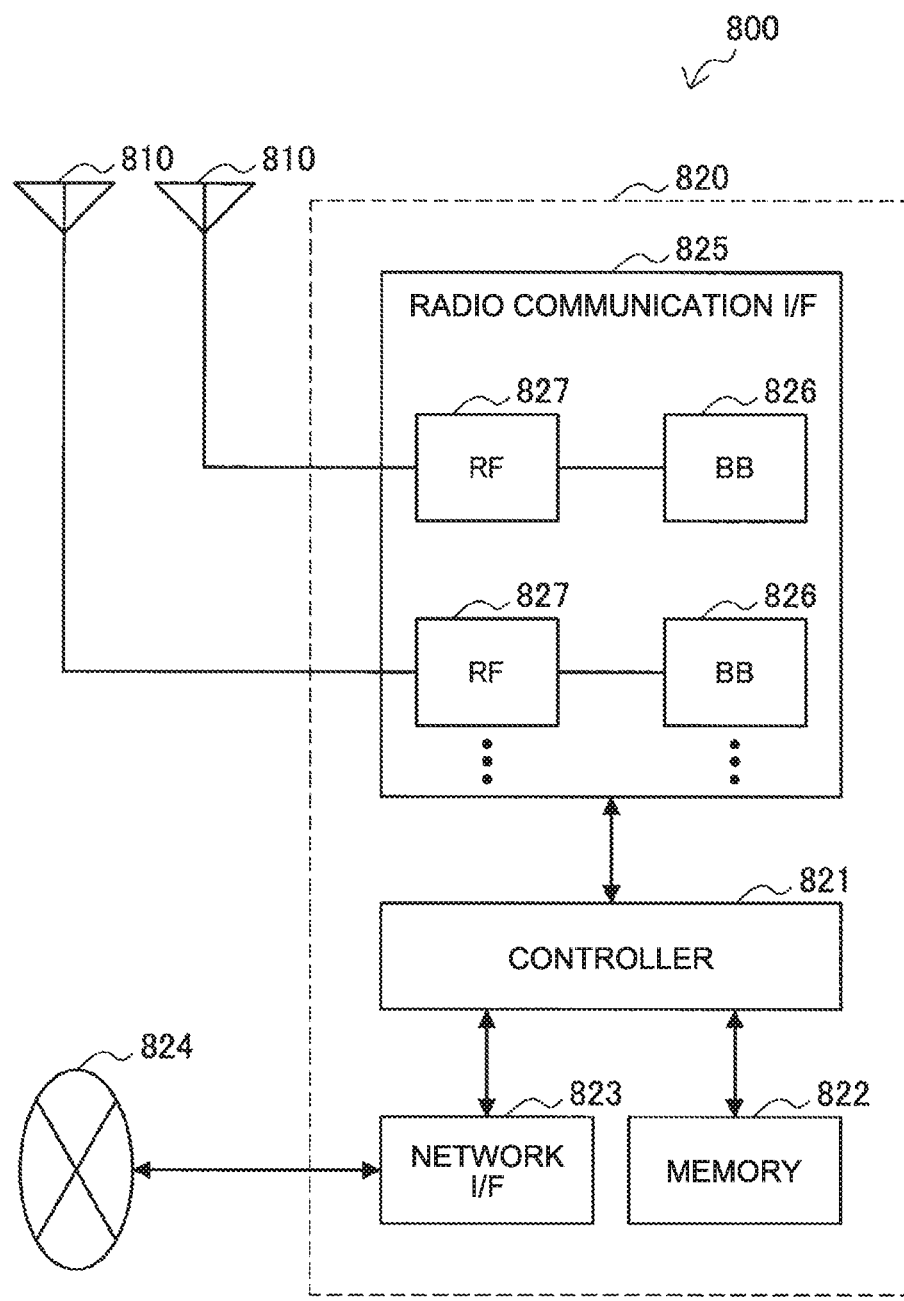
FIG. 17 is a block diagram illustrating a first example of a schematic configuration of an eNB in which the technology disclosed in the application concerned is applicable.

FIG. 17 is a block diagram illustrating a first example of a schematic configuration of the eNB in which the technology disclosed in the application concerned is applicable. An eNB 800 includes one or more antennas 810 and a base station device 820. The antennas 810 can be connected to the base station device 820 by RF cables.

Each antenna 810 includes one or more antenna elements (for example, a plurality of antenna elements constituting a MIMO antenna), and is used by the base station device 820 in transmitting and receiving radio signals. The eNB 800 includes a plurality of antennas 810 as illustrated in FIG. 17, and each antenna 810 corresponds to, for example, one of a plurality of frequency bands used by the eNB 800. Meanwhile, in the example illustrated in FIG. 17, although the eNB 800 includes a plurality of antennas 810, it can alternatively include only a single antenna 810.

The base station device 820 includes a controller 821, a memory 822, a network interface 823, and a radio communication interface 825.

The controller 821 can be, for example, a CPU or a DSP, and implements various functions of the upper layer of the base station device 820. For example, the controller 821 generates data packets from the data present in the signals processed by the radio communication interface 825, and transfers the generated data packets via the network interface 823. Moreover, the controller 821 can generate bundled packets by bundling the data received from a plurality of baseband processors, and transfer the bundled packets. Furthermore, the controller 821 can have logical functions for performing control such as radio resource control, radio bearer control, mobility management, admission control, and scheduling. That control can be performed in coordination with the surrounding eNBs or core network nodes. The memory 822 includes a RAM and a ROM, and is used to store programs executed by the controller 821 and to store a variety of control data (such as a terminal list, transmission power data, and scheduling data).

The network interface 823 is a communication interface for connecting the base station device 820 to a core network 824. The controller 821 can communicate with core network nodes and the other eNBs via the network interface 823. In that case, the eNB 800 can be connected to the core network nodes and the other eNBs by a logical interface (such as an Si interface or an X2 interface). The network interface 823 can be a wired communication interface, or can be a radio communication interface for radio backhauling. When the network interface 823 is a radio communication interface, it can perform radio communication using higher frequency bands than the frequency bands used by the radio communication interface 825.

The radio communication interface 825 supports any one cellular communication method such as the LTE (Long Term Evolution) or the LTE-Advanced, and provides radio connection via the antennas 810 to the terminals located inside the cell of the eNB 800. Typically, the radio communication interface 825 can include a baseband (BB) processor 826 and an RF circuit 827. The BB processor 826 can perform, for example, encoding/decoding, modulation/demodulation, and multiplexing/inverse multiplexing; and performs a variety of signal processing for each layer (for example, L1, MAC (Medium Access Control), RLC (Radio Link Control), and PDCP (Packet Data Convergence Protocol)). The BB processor 826 can include, in place of the controller 821, some or all of the logical functions mentioned earlier. The BB processor 826 can be a module including a memory for storing a communication control program, a processor for executing that program, and related circuits; and the functions of the BB processor 826 can be changed by updating the communication control program. Alternatively, the module can be a card or a blade that is inserted in a slot of the base station device 820, or can be a chip installed on the card or the blade. The RF circuit 827 can include a mixer, a filter, and an amplifier; and transmits and receives radio signals via the antennas 810. The RF circuit 827 can include a mixer, a filter, and an amplifier; and transmits and receives radio signals via the antennas 810.

The radio communication interface 825 includes a plurality of BB processors 826 as illustrated in FIG. 17, and each BB processor 826 can correspond to, for example, one of a plurality of frequency bands used by the eNB 800. Moreover, the radio communication interface 825 includes a plurality of RF circuits 827 as illustrated in FIG. 17, and each RF circuit 827 can correspond to, for example, one of a plurality of antenna elements. In FIG. 17 is illustrated the example in which the radio communication interface 825 includes a plurality of BB processors 826 and a plurality of RF circuits 827. However, alternatively, the radio communication interface 825 can include only a single BB processor 826 or only a single RF circuit 827.

In the eNB 800 illustrated in FIG. 17, one or more constituent elements of the processing unit 150 explained with reference to FIG. 6 (i.e., the transmission processing unit 151 and/or the notification unit 153) can be implemented in the radio communication interface 825. Alternatively, at least some of the constituent elements can be installed in the controller 821. As an example, in the eNB 800, a module including either some part of the radio communication interface 825 (for example, the BB processor 826) or the entire radio communication interface 825 and/or the controller 821 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 800, and the radio communication interface 825 (for example, the BB processor 826) and/or the controller 821 can execute that program. As described above, the eNB 800, or the base station device 820, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 800 illustrated in FIG. 17, the radio communication unit 120 that is explained with reference to FIG. 6 can be implemented in the radio communication interface 825 (for example, the RF circuit 827). Furthermore, the antenna unit 110 can be implemented in the antenna 810. Moreover, the network communication unit 130 can be implemented in the controller 821 and/or the network interface 823. Furthermore, the memory unit 140 can be implemented in the memory 822.

Second Application Example

Figure 18:
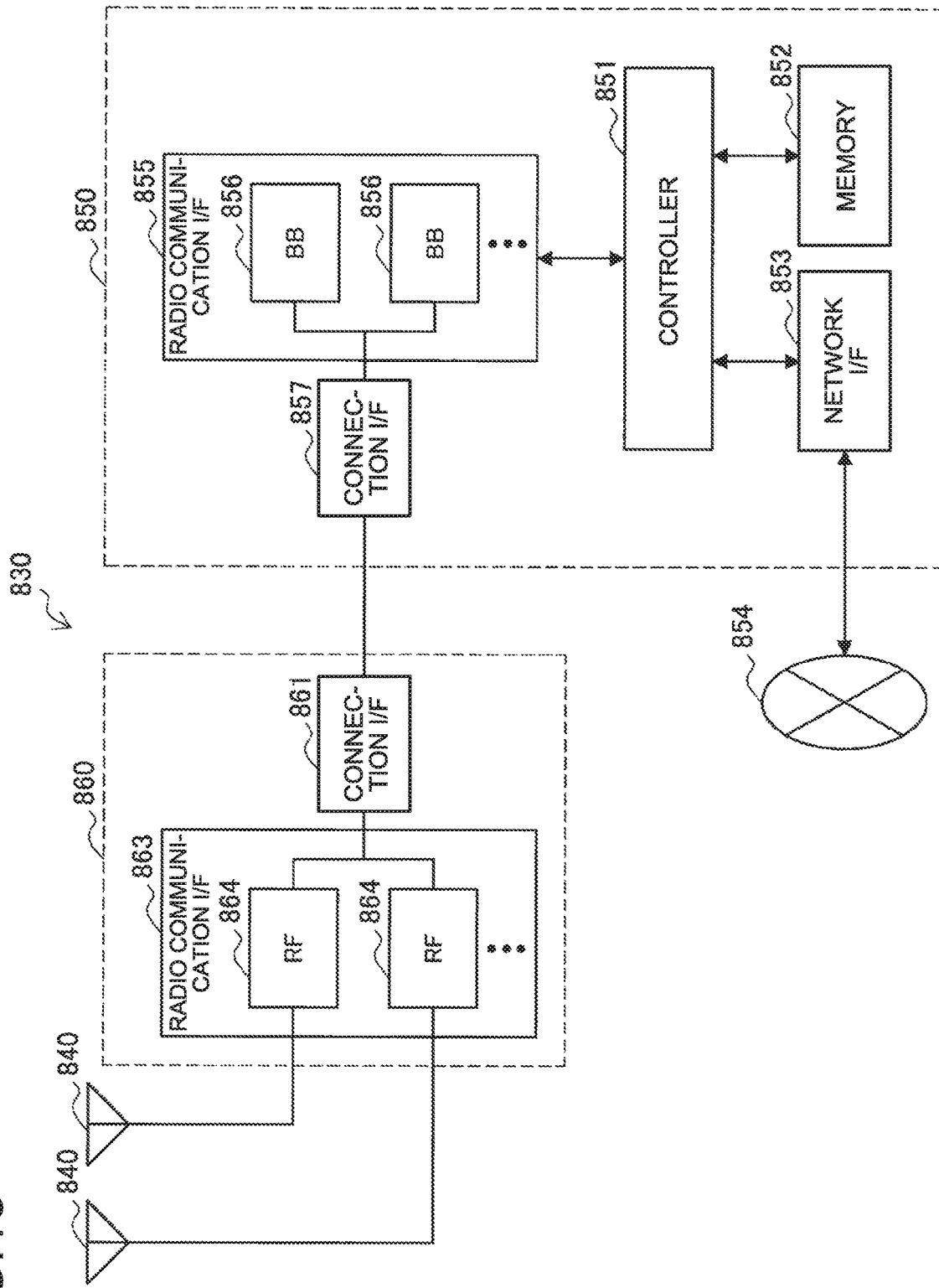
FIG. 18 is a block diagram illustrating a second example of a schematic configuration of the eNB in which the technology disclosed in the application concerned is applicable.

FIG. 18 is a block diagram illustrating a second example of a schematic configuration of the eNB in which the technology disclosed in the application concerned is applicable. An eNB 830 includes one or more antennas 840, a base station device 850, and an RRH 860. Each antenna 840 is connected to the RRH 860 by an RF cable. Moreover, the base station device 850 and the RRH 860 can be connected to each other by a high-speed line such as an optical fiber cable.

Each antenna 840 includes one or more antenna elements (for example, a plurality of antenna elements constituting a MIMO antenna), and is used by the RRH 860 in transmitting and receiving radio signals. The eNB 830 includes a plurality of antennas 840 as illustrated in FIG. 18, and each antenna 840 corresponds to, for example, one of a plurality of frequency bands used by the eNB 830. Meanwhile, in the example illustrated in FIG. 18, although the eNB 830 includes a plurality of antennas 840, it can alternatively include only a single antenna 840.

The base station device 850 includes a controller 851, a memory 852, a network interface 853, a radio communication interface 855, and a connection interface 857. The controller 851, the memory 852, and the network interface 853 are identical to the controller 821, the memory 822, and the network interface 823, respectively, explained with reference to FIG. 17.

The radio communication interface 855 supports any one cellular communication method such as the LTE or the LTE-Advanced, and provides radio connection via the RRH 860 and the antennas 840 to the terminals located inside the sector corresponding to the RRH 860. Typically, the radio communication interface 855 can include a BB processor 856. The BB processor 856 is identical to the BB processor 826 explained with reference to FIG. 17, except for the fact that the BB processor 856 is connected to an RF circuit 864 of the RRH 860 via the connection interface 857. The radio communication interface 855 includes a plurality of BB processors 856 as illustrated in FIG. 18, and each BB processor 856 can correspond to, for example, one of a plurality of frequency bands used by the eNB 830. Meanwhile, in the example illustrated in FIG. 18, although the radio communication interface 855 includes a plurality of BB processors 856, it can alternatively include only a single BB processor 856.

The connection interface 857 is meant for connecting the base station device 850 (the radio communication interface 855) to the RRH 860. The connection interface 857 can be a communication module for enabling communication in the abovementioned high-speed line connecting the base station device 850 (the radio communication interface 855) and the RRH 860.

The RRH 860 includes a connection interface 861 and a radio communication interface 863.

The connection interface 861 is an interface for connecting the RRH 860 (the radio communication interface 863) to the base station device 850. The connection interface 861 can be a communication module enabling communication in the high-speed line.

The radio communication interface 863 transmits and receives radio signals via the antenna 840. Typically, the radio communication interface 863 can include the RF circuit 864. The RF circuit 864 can include a mixer, a filter, and an amplifier; and transmits and receives radio signals via the antennas 840. The radio communication interface 863 includes a plurality of RF circuits 864 as illustrated in FIG. 18, and each RF circuit 864 can correspond to, for example, one of a plurality of antenna elements. Meanwhile, in the example illustrated in FIG. 18, although the radio communication interface 863 includes a plurality of RF circuits 864, it can alternatively include only a single RF circuit 864.

In the eNB 830 illustrated in FIG. 18, one or more constituent elements included in the processing unit 150 explained with reference to FIG. 6 (i.e., the transmission processing unit 151 and/or the notification unit 153) can be implemented in the radio communication interface 855 and/or the radio communication interface 863. Alternatively, at least some of the constituent elements can be installed in the controller 851. As an example, in the eNB 830, a module including either some part of the radio communication interface 855 (for example, the BB processor 856) or the entire radio communication interface 855 and/or the controller 851 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 830, and the radio communication interface 855 (for example, the BB processor 856) and/or the controller 851 can execute that program. As described above, the eNB 830, the base station device 850, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 830 illustrated in FIG. 18, for example, the radio communication unit 120 that is explained with reference to FIG. 6 can be implemented in the radio communication interface 863 (for example, the RF circuit 864). Furthermore, the antenna unit 110 can be implemented in the antenna 840. Moreover, the network communication unit 130 can be implemented in the controller 851 and/or the network interface 853. Furthermore, the memory unit 140 can be implemented in the memory 852.

2.2. Application Examples Related to Terminal Device

First Application Example

Figure 19:
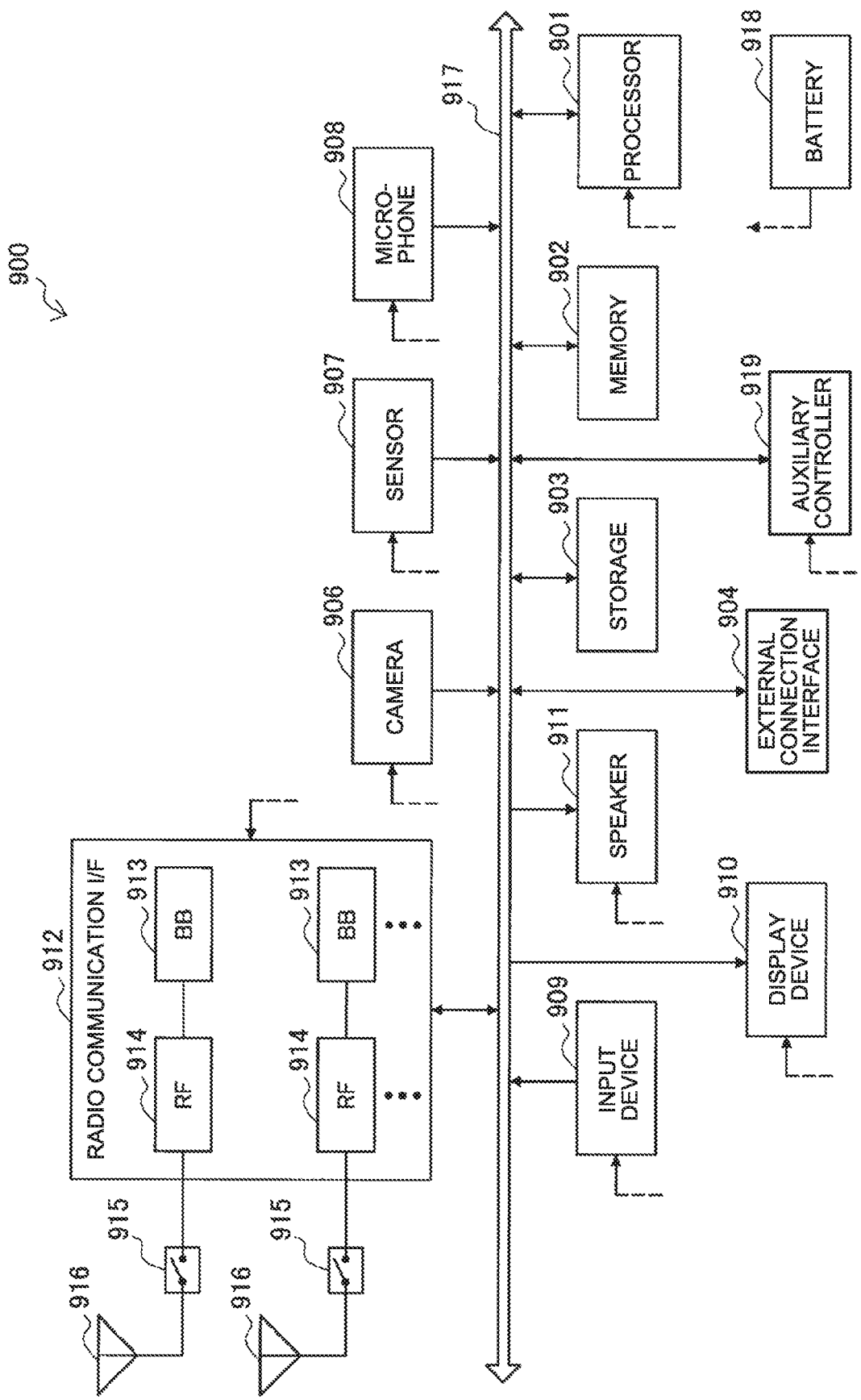
FIG. 19 is a block diagram illustrating an example of a schematic configuration of a smartphone 900 in which the technology disclosed in the application concerned is applicable.

FIG. 19 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 can be, for example, a CPU or an SoC (System on Chip), and controls the functions of the application layer and the other layers of the smartphone 900. The memory 902 includes a RAM and a ROM, and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sound input to the smartphone 900 into sound signals. The input device 909 includes, for example, a touch sensor for detecting a touch on the screen of the display device 910, or a keypad, or a keyboard, or buttons or switches; and receives operations and information input from the user. The display device 910 has a screen such as a liquid crystal display (LCD) or an organic light emitting diode (OLED) display, and displays output images of the smartphone 900. The speaker 911 converts the sound signals, which are output from the smartphone 900, into sound.

The radio communication interface 912 supports any one cellular communication method such as the LTE or the LTE-Advanced, and implements radio communication. Typically, the radio communication interface 912 can include a BB processor 913 and an RF circuit 914. The BB processor 913 can perform, for example, encoding/decoding, modulation/demodulation, and multiplexing/inverse multiplexing; and performs a variety of signal processing for radio communication. The RF circuit 914 can include a mixer, a filter, and an amplifier; and transmits and receives radio signals via the antennas 916. Meanwhile, the radio communication interface 912 can be a one-chip module in which the BB processor 913 and the RF circuit 914 are integrated. Moreover, the radio communication interface 912 can include a plurality of BB processors 913 and a plurality of RF circuits 914 as illustrated in FIG. 19. Meanwhile, in the example illustrated in FIG. 19, although the radio communication interface 912 includes a plurality of BB processor 913 and a plurality of RF circuits 914, it can alternatively include only a single BB processor 913 or only a single RF circuit 914.

Moreover, in addition to supporting the cellular communication method, the radio communication interface 912 can also support other types of radio communication methods such as the near field communication method, the proximity radio communication method, and the wireless LAN (Local Area Network) method. In that case, the radio communication interface 912 can include the BB processors 913 and the RF circuits 914 separately for each radio communication method.

Each antenna switch 915 switches the connection destinations of the antennas 916 among a plurality of circuits included in the radio communication interface 912 (for example, the circuits meant for different radio communication methods).

Each antenna 916 includes one or more antenna elements (for example, a plurality of antenna elements constituting a MIMO antenna), and is used by the radio communication interface 912 in transmitting and receiving radio signals. The smartphone 900 can include a plurality of antennas 916 as illustrated in FIG. 19. Meanwhile, in the example illustrated in FIG. 19, although the smartphone 900 includes a plurality of antennas 916, it can alternatively include only a single antenna 916.

Moreover, the smartphone 900 can include the antennas 916 separately for each radio communication method. In that case, the antenna switch 915 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electrical power to each block of the smartphone 900, which is illustrated in FIG. 19, via a power supply line that is partially illustrated in FIG. 19 using dashed lines. The auxiliary controller 919 implements the minimum required functions of the smartphone 900 in, for example, the sleep mode.

In the smartphone 900 illustrated in FIG. 19, one or more constituent elements included in the processing unit 240 explained with reference to FIG. 7 (i.e., the obtaining unit 241 and/or the reception processing unit 243) can be implemented in the radio communication interface 912. Alternatively, at least some of the constituent elements can be installed in the processor 901 or the auxiliary controller 919. As an example, in the smartphone 900, a module including either some part of the radio communication interface 912 (for example, the BB processor 913) or the entire radio communication interface 912, the processor 901, and/or the auxiliary controller 919 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the smartphone 900; and the radio communication interface 912 (for example, the BB processor 913), the processor 901, and/or the auxiliary controller 919 can execute that program. As described above, the smartphone 900 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the smartphone 900 illustrated in FIG. 19, the radio communication unit 220 that is explained with reference to FIG. 7 can be implemented in the radio communication interface 912 (for example, the RF circuit 914). Furthermore, the antenna unit 210 can be implemented in the antenna 916. Moreover, the memory unit 230 can be implemented in the memory 902.

Second Application Example

FIG. 20 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a radio communication interface 933, one or more antenna switches 936, one or more antennas 937, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, or includes buttons, or includes switches; and receives operations and information input from the user. The display device 930 has a screen such as an LCD or an OLED display, and displays the navigation functions or images of the reproduced contents. The speaker 931 converts the sounds of the navigation functions or the sounds of the reproduced contents.

The radio communication interface 933 supports any one cellular communication method such as the LTE or the LTE-Advanced, and implements radio communication. Typically, the radio communication interface 933 can include a BB processor 934 and an RF circuit 935. The BB processor 934 can perform, for example, encoding/decoding, modulation/demodulation, and multiplexing/inverse multiplexing; and performs a variety of signal processing for radio communication. The RF circuit 935 can include a mixer, a filter, and an amplifier; and transmits and receives radio signals via the antennas 937. Meanwhile, the radio communication interface 933 can be a one-chip module in which the BB processor 934 and the RF circuit 935 are integrated. Moreover, the radio communication interface 933 can include a plurality of BB processors 934 and a plurality of RF circuits 935 as illustrated in FIG. 20. Meanwhile, in the example illustrated in FIG. 20, although the radio communication interface 933 includes a plurality of BB processor 934 and a plurality of RF circuits 935, it can alternatively include only a single BB processor 934 or only a single RF circuit 935.

Moreover, in addition to supporting the cellular communication method, the radio communication interface 933 can also support other types of radio communication methods such as the near field communication method, the proximity radio communication method, and the wireless LAN method. In that case, the radio communication interface 933 can include the BB processors 934 and the RF circuits 935 separately for each radio communication method.

Each antenna switch 936 switches the connection destinations of the antennas 937 among a plurality of circuits included in the radio communication interface 933 (for example, the circuits meant for different radio communication methods).

Each antenna 937 includes one or more antenna elements (for example, a plurality of antenna elements constituting a MIMO antenna), and is used by the radio communication interface 933 in transmitting and receiving radio signals. The car navigation device 920 can include a plurality of antennas 937 as illustrated in FIG. 20. Meanwhile, in the example illustrated in FIG. 20, although the car navigation device 920 includes a plurality of antennas 937, it can alternatively include only a single antenna 937.

Moreover, the car navigation device 920 can include the antennas 937 separately for each radio communication method. In that case, the antenna switch 936 can be omitted from the configuration of the car navigation device 920.

The battery 938 supplies electrical power to each block of the car navigation device 920, which is illustrated in FIG. 20, via a power supply line that is partially illustrated in FIG. 20 using dashed lines. Moreover, the battery 938 stores the electrical power supplied from the vehicle.

In the car navigation device 920 illustrated in FIG. 20, one or more constituent elements included in the processing unit 240 explained with reference to FIG. 7 (i.e., the obtaining unit 241 and/or the reception processing unit 243) can be implemented in the radio communication interface 933. Alternatively, at least some of the constituent elements can be installed in the processor 921. As an example, in the car navigation device 920, a module including either some part of the radio communication interface 933 (for example, the BB processor 934) or the entire radio communication interface 933 and/or the processor 921 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the car navigation device 920; and the radio communication interface 933 (for example, the BB processor 934) and/or the processor 921 can execute that program. As described above, the car navigation device 920 or the abovementioned module can be provided as a device including the abovementioned one or more constituent elements; and a program meant for making a processor function as the abovementioned one or more constituent elements can be provided. Alternatively, a readable recording medium in which the program is recorded can be provided.

Moreover, in the car navigation device 920 illustrated in FIG. 20, the radio communication unit 220 that is explained with reference to FIG. 7 can be implemented in the radio communication interface 933 (for example, the RF circuit 935). Furthermore, the antenna unit 210 can be implemented in the antenna 937. Moreover, the memory unit 230 can be implemented in the memory 922.

Meanwhile, the technology disclosed in the application concerned can be implemented as an in-vehicle system (or a vehicle) 940 that includes one or more blocks of the car navigation device 920; the in-vehicle network 941; and a vehicle-side module 942. That is, the in-vehicle system 940 can be provided as a device that includes the obtaining unit 241 and/or the reception processing unit 243. The vehicle-side module 942 generates vehicle data such as the vehicle speed, the engine rotation count, and breakdown information; and outputs the generated data to the in-vehicle network 941.

2. SUMMARY

As described above, according to the embodiment of the application concerned, it becomes possible to provide the terminal device 200 that, at the time of performing inter-device communication, can select appropriate carriers from among a plurality of carriers, and can appropriately decide on the transmission power.

Meanwhile, the steps of the operations performed by the devices in the present written description need not necessarily be processed chronologically according to the order given in sequence diagrams and flowcharts. For example, the steps of the operations performed by the devices can be processed in a different order than the order given in flowcharts, or can be processed in parallel.

It is also possible to create a computer program for making the hardware such as the CPU, the ROM, and the RAM embedded in each device implement the functions equivalent to the configuration of the device. Moreover, it is also possible to provide a memory medium in which that computer program is stored. Furthermore, the functional blocks illustrated in the functional block diagrams can be configured using hardware or hardware circuits, so as to implement the sequence of operations using hardware or hardware circuits.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

For example, the embodiment according to the application concerned is of course applicable to relay communication. For example, when vehicles communicate with each other, it is also possible to think of a situation in which the communication is relayed via another vehicle. In such relay communication too, the embodiment according to the application concerned is applicable. Moreover, the embodiment according to the application concerned is also applicable in other types of sidelink communication. That is, the embodiment according to the application concerned is also applicable in mobile objects other than automobiles.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

A radio communication device comprising:

a communication unit that performs inter-device communication according to carrier aggregation; and a processing unit that selects transmission resource to be used in the inter-device communication according to carrier aggregation, wherein the processing unit selects, as the transmission resource, carrier that is less affected by interference based on information related to inter-carrier interference.

(2)

The radio communication device according to (1), wherein the processing unit selects carrier based on criterion related to inter-carrier interference.

(3)

The radio communication device according to (2), wherein, at time of selecting carrier by taking into account a plurality of the criterion, the processing unit assigns priority order to the criteria.

(4)

The radio communication device according to (2), wherein the criterion represents channel busy ratio of carrier.

(5)

The radio communication device according to (4), wherein the processing unit measures channel busy ratio of carrier by performing background sensing of carrier.

(6)

The radio communication device according to (5), wherein the processing unit selects carrier based on result of background sensing that was being performed till certain point of time before timing of carrier selection.

(7)

The radio communication device according to (2), wherein the criterion represents IBE (In-Band Emission).

(8)

The radio communication device according to (2), wherein the criterion represents level that is set in carrier.

(9)

The radio communication device according to (2), wherein the criterion represents whether or not anchor carrier is set.

(10)

The radio communication device according to (1), wherein the processing unit selects such carriers which include candidate carriers that are set based on capability of the radio communication device and attribute of transmission packet to be transmitted in the inter-device communication.

(11)

The radio communication device according to (1), wherein, based on attribute of transmission packet to be transmitted in the inter-device communication, the processing unit selects carrier ranks that are set in carriers.

(12)

The radio communication device according to any one of (1) to (11), wherein, based on capability of the radio communication device, the processing unit decides on number of carriers to be selected as the transmission resource.

(13)

The radio communication device according to any one of (1) to (11), wherein, based on category of the radio communication device, the processing unit decides on number of carriers to be selected as the transmission resource.

(14)

The radio communication device according to any one of (1) to (11), wherein, based on capability of communications partner, the processing unit decides on number of carriers to be selected as the transmission resource.

(15)

The radio communication device according to (14), wherein, based on battery capacity of communications partner, the processing unit decides on number of carriers to be selected as the transmission resource.

(16)

The radio communication device according to (14), wherein the processing unit takes into account sensing load of communications partner and accordingly decides on number of carriers to be selected as the transmission resource.

(17)

The radio communication device according to (14), wherein, according to attribute of transmission packet to be transmitted in the inter-device communication, the processing unit decides on number of carriers to be selected.

(18)

The radio communication device according to any one of (1) to (17), wherein, at time of performing inter-device communication using a plurality of carriers, the processing unit sets transmission power for each carrier.

(19)

The radio communication device according to (18), wherein, when there is a plurality of transmission packets to be transmitted, the processing unit limits number of transmission packets to be concurrently transmitted.

(20)

The radio communication device according to (19), wherein, based on transmission priority or degree of importance of the transmission packets, the processing unit selects transmission packets to be concurrently transmitted.

(21)

The radio communication device according to (20), wherein, after elapse of predetermined period of time since transmission of selected transmission packets, the processing unit transmits unselected transmission packets or dropped transmission packets.

(22)

The radio communication device according to (20), wherein, when number of times of dropping of transmission packets reaches predetermined maximum consecutive drop count, the processing unit transmits the transmission packets without dropping.

(23)

A radio communication method implemented in a processor, comprising:
performing inter-device communication according to carrier aggregation; and
selecting that, at time of selecting transmission resource to be used in the inter-device communication according to carrier aggregation, includes selecting, as the transmission resource, carrier that is less affected by interference based on information related to inter-carrier interference.

(24)

A computer program that causes a computer to execute:
performing inter-device communication according to carrier aggregation; and
selecting that, at time of selecting transmission resource to be used in the inter-device communication according to carrier aggregation, includes selecting, as the transmission resource, carrier that is less affected by interference based on information related to inter-carrier interference.

REFERENCE SIGNS LIST

100 base station
200 terminal device

The invention claimed is:
1. A radio communication device comprising:
communication circuitry that performs inter-device communication according to carrier aggregation; and
processing circuitry that selects a transmission resource to be used in the inter-device communication according to the carrier aggregation, wherein
the processing circuitry selects, as the transmission resource, at least one carrier, of a plurality of candidate carriers, that is less affected by interference based on information related to inter-carrier interference, and based on a capability of a communications partner of the inter-device communication, the processing circuitry decides on a number of carriers of the at least one carrier.

2. The radio communication device according to claim 1, wherein the processing circuitry selects the at least one carrier based on at least one criterion related to the inter-carrier interference.

3. The radio communication device according to claim 2, wherein, at time of selecting the at least one carrier by taking into account a plurality of the at least one criterion, the processing circuitry assigns a priority order to each of the plurality of the at least one criterion.

4. The radio communication device according to claim 2, wherein the at least one criterion represents a channel busy ratio of the at least one carrier.

5. The radio communication device according to claim 4, wherein the processing circuitry measures the channel busy ratio of the at least one carrier by performing background sensing of the at least one carrier.

6. The radio communication device according to claim 5, wherein the processing circuitry selects the at least one carrier based on result of the background sensing that was being performed till a predetermined point of time before a timing of the carrier selection.

7. The radio communication device according to claim 2, wherein the criterion represents an IBE (In-Band Emission).

8. The radio communication device according to claim 2, wherein the criterion represents a level of the inter-carrier interference that is set in the at least one carrier.

9. The radio communication device according to claim 2, wherein the criterion represents whether or not an anchor carrier is set.

10. The radio communication device according to claim 1, wherein the processing circuitry selects the at least one carrier from the plurality of candidate carriers based on a capability of the radio communication device and an attribute of a transmission packet to be transmitted in the inter-device communication.

11. The radio communication device according to claim 10, wherein, based on an attribute of a transmission packet to be transmitted in the inter-device communication, the processing circuitry selects carrier ranks for the plurality of candidate carriers.

12. The radio communication device according to claim 1, wherein, based on a capability of the radio communication device, the processing circuitry decides on a number of the plurality of candidate carriers to be selected as the transmission resource.

13. The radio communication device according to claim 1, wherein, based on a category of the radio communication device, the processing circuitry decides on a number of carriers of the at least one carrier to be selected as the transmission resource.

14. The radio communication device according to claim 1, wherein the capability of the communications partner comprises a battery capacity of the communications partner.

15. The radio communication device according to claim 1, wherein the capability of the communications partner comprises a load of the communications partner.

16. The radio communication device according to claim 1, wherein the processing circuitry decides on the number of carriers of the at least one carrier based on an attribute of the transmission packet to be transmitted in the inter-device communication.

17. The radio communication device according to claim 1, wherein, at a time of performing the inter-device communication using a plurality of carriers of the plurality of candidate carriers, the processing circuitry sets a transmission power for each carrier of the plurality of carriers.

18. The radio communication device according to claim 17, wherein, when there is a plurality of transmission packets to be transmitted, the processing circuitry limits a number of transmission packets to be concurrently transmitted.

19. The radio communication device according to claim 18, wherein the processing circuitry limits the number of transmission packets to be concurrently transmitted based on a transmission priority or a degree of importance of the transmission packets to be concurrently transmitted.

20. The radio communication device according to claim 19, wherein, after a lapse of a predetermined period of time since a transmission of selected transmission packets, the processing circuitry transmits unselected transmission packets or dropped transmission packets for transmission.

21. The radio communication device according to claim 19, wherein, when number of times of dropping of transmission packets reaches a predetermined maximum consecutive drop count, the processing circuitry transmits previously dropped transmission packets without dropping.

22. A radio communication method implemented in a processor, comprising:
    performing inter-device communication according to carrier aggregation; and
    selecting a transmission resource to be used in the inter-device communication according to the carrier aggregation,
    wherein the selecting comprises, selectins, as the transmission resource, at least one carrier, of a plurality of candidate carriers, that is less affected by interference based on information related to inter-carrier interference, and
    wherein a number of carriers of the at least one carrier is decided based on a capability of a communications partner of the inter-device communication.

23. A non-transitory computer-readable product containing a computer program that causes a computer to execute:
    performing inter-device communication according to carrier aggregation; and
    selecting a transmission resource to be used in the inter-device communication according to the carrier aggregation,
    wherein the selecting comprises, selecting, as the transmission resource, at least one carrier, of a plurality of candidate carriers, that is less affected by interference based on information related to inter-carrier interference, and
    wherein a number of carriers of the at least one carrier is decided based on a capability of a communications partner of the inter-device communication.

* * * * *